(12) United States Patent
Barkie et al.

(10) Patent No.: US 8,850,423 B2
(45) Date of Patent: Sep. 30, 2014

(54) ASSISTING SERVER MIGRATION

(75) Inventors: Eric J. Barkie, Research Triangle Park, NC (US); James R. S. Barros, II, Research Triangle Park, NC (US); Kamal Bhattacharya, Hawthorne, NY (US); Karen Cheng, North York (CA); Robert Filepp, Hawthorne, NY (US); Kevin D. Galloway, Austin, TX (US); Nikolai Joukov, Hawthorne, NY (US); Jing Luo, Beijing (CN); Colm V. Malone, Yorktown Heights, NY (US); Birgit M. Pfitzmann, Hawthorne, NY (US); Brian L. Peterson, Somers, NY (US); Harigovind V. Ramasamy, Hawthorne, NY (US); Kewei Sun, Beijing (CN); Norbert G. Vogl, Mahopac, NY (US); David L. Westerman, Pittsburgh, PA (US); Christopher C. Young, Waterloo (CA)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 12/608,609

(22) Filed: Oct. 29, 2009

(65) Prior Publication Data

US 2011/0107327 A1    May 5, 2011

(51) Int. Cl.
*G06F 9/445*    (2006.01)

(52) U.S. Cl.
CPC ........................................ *G06F 8/63* (2013.01)
USPC .......................................................... 717/176

(58) Field of Classification Search
CPC ......................................................... G06F 8/63
USPC .......................................................... 717/176
See application file for complete search history.

(56) References Cited

U.S. PATENT DOCUMENTS

| 5,678,044 | A | | 10/1997 | Pastilha et al. |
| 5,708,812 | A | * | 1/1998 | Van Dyke et al. ............ 717/171 |
| 5,832,274 | A | * | 11/1998 | Cutler et al. .................. 717/171 |
| 6,735,691 | B1 | * | 5/2004 | Capps et al. ....................... 713/1 |
| 6,889,376 | B1 | * | 5/2005 | Barritz et al. ................. 717/175 |

(Continued)

OTHER PUBLICATIONS

Zuber, B., "Virtualization: IBM Insights in Sizing Servers for Virtualization", VMWORLD 2006, Sep. 28, 2006.

(Continued)

*Primary Examiner* — Wei Zhen
*Assistant Examiner* — Lanny Ung
(74) *Attorney, Agent, or Firm* — Scully, Scott, Murphy & Presser, P.C.; Louis J. Percello, Esq.

(57) ABSTRACT

The present invention describes a method and system for preparing a migration and consolidation of at least one source application to be migrated to or consolidated in at least one heterogeneous server device. A computing system selects at least one prospective target platform component based on an evaluation of at least one source platform component, a requirement of the at least one source application, and a compatibility and an affinity of the at least one prospective target platform component. The computing system collects first metadata of the at least one source platform component and the at least one prospective target platform component. The computing system collects second metadata associated with the migration and consolidation. The computing system groups the first metadata and the second metadata into a RFM (Request For Migration). The computing system prepares and configures a final target platform in accordance with the RFM.

23 Claims, 13 Drawing Sheets

(56) References Cited

U.S. PATENT DOCUMENTS

| | | |
|---|---|---|
| 7,080,159 B2 * | 7/2006 | Chu et al. ............... 709/246 |
| 7,379,996 B2 * | 5/2008 | Papatla et al. ............ 709/224 |
| 7,577,722 B1 * | 8/2009 | Khandekar et al. ........ 709/220 |
| 7,975,028 B2 * | 7/2011 | Ryan et al. ............... 709/220 |
| 2005/0120344 A1 * | 6/2005 | Asare et al. .............. 717/174 |
| 2006/0242077 A1 * | 10/2006 | Dettinger et al. ........... 705/59 |
| 2007/0250829 A1 | 10/2007 | Hillier et al. |
| 2008/0209016 A1 * | 8/2008 | Karve et al. .............. 709/221 |
| 2008/0291204 A1 | 11/2008 | Korupolu et al. |

OTHER PUBLICATIONS

Mehta, S., et al., "ReCon: A Tool to Recommend Dynamic Server Consolidation in Multi-Cluster Data Centers",: Network Operations and Management Symposium, NOMS, IEEE, Apr. 7-11, 2008, pp. 363-370, Salvador, Bahia.

"A Pragmatic Approach to Server and Data Center Consolidation", Platespin, Mar. 2007, www.platespin.com.

* cited by examiner

FIG. 10

ASSISTING SERVER MIGRATION

BACKGROUND

The present invention relates generally to a migration and consolidation of computer-based applications from one system to another, and more particularly to an aid for identification, selection, provisioning, and configuration of software and hardware prior to the migration and consolidation of computer-based applications from a source platform to a heterogeneous target platform.

A computer-based application refers to software or hardware application operating in or on a computer (e.g., desktop, laptop, netbook, workstation, mainframe, etc.). A computer-based application typically addresses some business, scientific, or individual need. Examples of applications include, but not limited to: spreadsheets, electronic mail clients and servers, accounting software, loan processing software, inventory management software, etc. A source application refers to an application to be migrated and/or consolidated. A source platform refers to a sum of dependencies that the source application has upon both hardware and software. A dependency of a first application/component on a second application/component means that the first application/component needs the second application/component to perform its functions. A source platform component refers to an individual dependency that the source application has upon hardware, software and/or attributes of the hardware and software including, but not being limited to: physical location(s) of the hardware and/or software. A (final) target application refers to an application that exists after the migration and/or consolidation. A (final) target platform refers to a sum of dependencies that the final target application has upon hardware, software, and/or attributes including, but not being limited to: physical location(s) of the hardware and/or software. An affinity refers to similarity between different software or hardware components. For example the Linux and AIX® operating systems share affinity in that both are variations of UNIX and in that applications and scripts written for one may, with little change, be capable of running on the other. A web page, http://www-03.ibm.com/systems/power/software/aix/linux.html, describes the AIX's affinity with Linux in detail. Compatibility refers to a capability of orderly, efficient integration and operation with other elements in a system with no modification or conversion required. Compatibility might best be shown by an example of its opposite: incompatibility. For example, IBM® Rational® ClearCase® attempts to create a Versioned Object Base from a client at a lower version than the server (for example a 2003.06.00 client storing a VOB on a 7.0 server) results in an error.

Since the 1980s, it has been a common practice for an organization to increase IT capacity or new capabilities simply by adding low-cost servers because the initial capital expense of adding the low-cost servers is relatively low. However, a proliferation (i.e., a rapid increase) of servers can cause a high ownership cost in terms of a power consumption, floor space, etc. A proliferation of servers also leads to increased costs and risks in server management due to the complexity of supporting a myriad of different hardware and software configurations. Advances in a virtualization technology (e.g., IBM System z and z/VM, IBM PowerVM, VMware, Java® Virtual Machine) and mainframe hardware have now made a consolidation of applications onto a fewer number of centralized servers very attractive. However, a process of planning and performing such a migration is time-consuming, costly, and prone to an error. A risk is also involved in the migration process due to a high degree of complexity of applications deployed on server devices. For example, consider a large number of distributed applications (e.g., 1 million applications) that are deployed on a many server devices. One server device could host an application on a middleware product to meet performance and high availability requirements. That application may be distributed over several server devices. This distributed application may require a database which is deployed on another server device. Messaging components to support information exchange with other internal or external applications may require a set of server devices and be deployed to several application servers (e.g., IBM® WebSphere® Application Server). A consolidation of this set of servers may require an in-depth knowledge of configurations of the set of servers and an insight into how to best plan and run a migration of source applications to the final target platform.

Often, in order to achieve savings of the migration and/or consolidation, it may be necessary to change the underlying hardware and operating system on which the final target applications are deployed. In these cases traditional virtualization techniques fail to provide a solution to "lift-and-shift" (i.e., move or transfer) source applications from one platform to another. Traditionally, a user is required to manually replicate an application eco-system, i.e. all prerequisite software, hardware, and settings onto a final target environment (i.e., a final target platform). Due to the limitation of traditional virtualization techniques and manual replication, an application migration and consolidation becomes an expensive, tedious, and error-prone manual process.

Thus, it is desirable to provide a tool assisting a user in performing a planning, configuration and provisioning of the target platform on a virtual machine (e.g., Java® Runtime environment, IBM z/VM, IBM PowerVM) based on an understanding of the source platform.

SUMMARY OF THE INVENTION

The present invention reduces risks, costs, and duration of a migration and consolidation of server devices by providing tools that assist a user in performing the planning, configuration, and provisioning of the target platform on a virtual machine based on an understanding of the source platform.

In one embodiment, there is provided a computer-implemented method for preparing a migration and consolidation of at least one source application to be migrated to or consolidated in at least one heterogeneous server device, the method comprising:

selecting at least one prospective target platform component based on one or more of: an evaluation of at least one source platform component and a requirement of the at least one source application, wherein the source platform component referring to an individual dependency that the at least one source application has upon hardware, software or at least one attribute of the hardware and software, the prospective target platform component referring to an individual software, hardware or attributes of the individual software and hardware to be provisioned for the at least one server device;

collecting first metadata of the at least one source platform component and the at least one prospective target platform component;

collecting second metadata associated with the migration and consolidation; and preparing and configuring a final target platform based on the first metadata and the second metadata, the final target platform referring to a sum of dependencies a final target application has upon hardware or software, the final target application referring to an application that exists after the migration and consolidation In one embodiment, there is provided a computer-implemented system for preparing a migration and consolidation of at least one source application to be migrated to or consolidated in at least one heterogeneous server device, the system comprising:

a memory device; and a processor unit in communication with the memory device, the processor unit performs steps of:

selecting at least one prospective target platform component based on one or more of: an evaluation of at least one source platform component and a requirement of the at least one source application, wherein the source platform component referring to an individual dependency that the at least one source application has upon hardware, software or at least one attribute of the hardware and software, the prospective target platform component referring to an individual software, hardware or attributes of the individual software and hardware to be provisioned for the at least one server device;

collecting first metadata of the at least one source platform component and the at least one prospective target platform component;

collecting second metadata associated with the migration and consolidation; and preparing and configuring a final target platform based on the first metadata and the second metadata, the final target platform referring to a sum of dependencies a final target application has upon hardware or software, the final target application referring to an application that exists after the migration and consolidation.

In a further embodiment, the processor unit further performs one or more steps of:

discovering information of source platform, the source platform referring to a sum of dependencies a source application has upon software or hardware, the source application referring to an application in the server device to be migrated or consolidated; and packing the first metadata and the second metadata into a RFM (Request For Migration) data structure specifying the at least one selected prospective target platform component, the first metadata and the second metadata.

In a further embodiment, the processor unit further performs a step of:

providing an interface for allowing a user to design the RFM.

In a further embodiment, the interface performs steps of:

allowing the user to search the source platform based on a search criterion;

presenting the user a first option to migrate the at least one source platform component to the final target platform without a modification;

presenting the user a second option to modify attributes of the at least one source platform component;

presenting the user a third option to specify at least one final target platform component to be added to at least one final target platform, the at least one final target platform referring to an individual dependency that the final target application has upon; and intelligently suggesting configuration values of the at least one final target platform component.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

FIG. 10 illustrates a user interface for designing a RFM according to one embodiment of the present invention.

DETAILED DESCRIPTION

Figure 1:
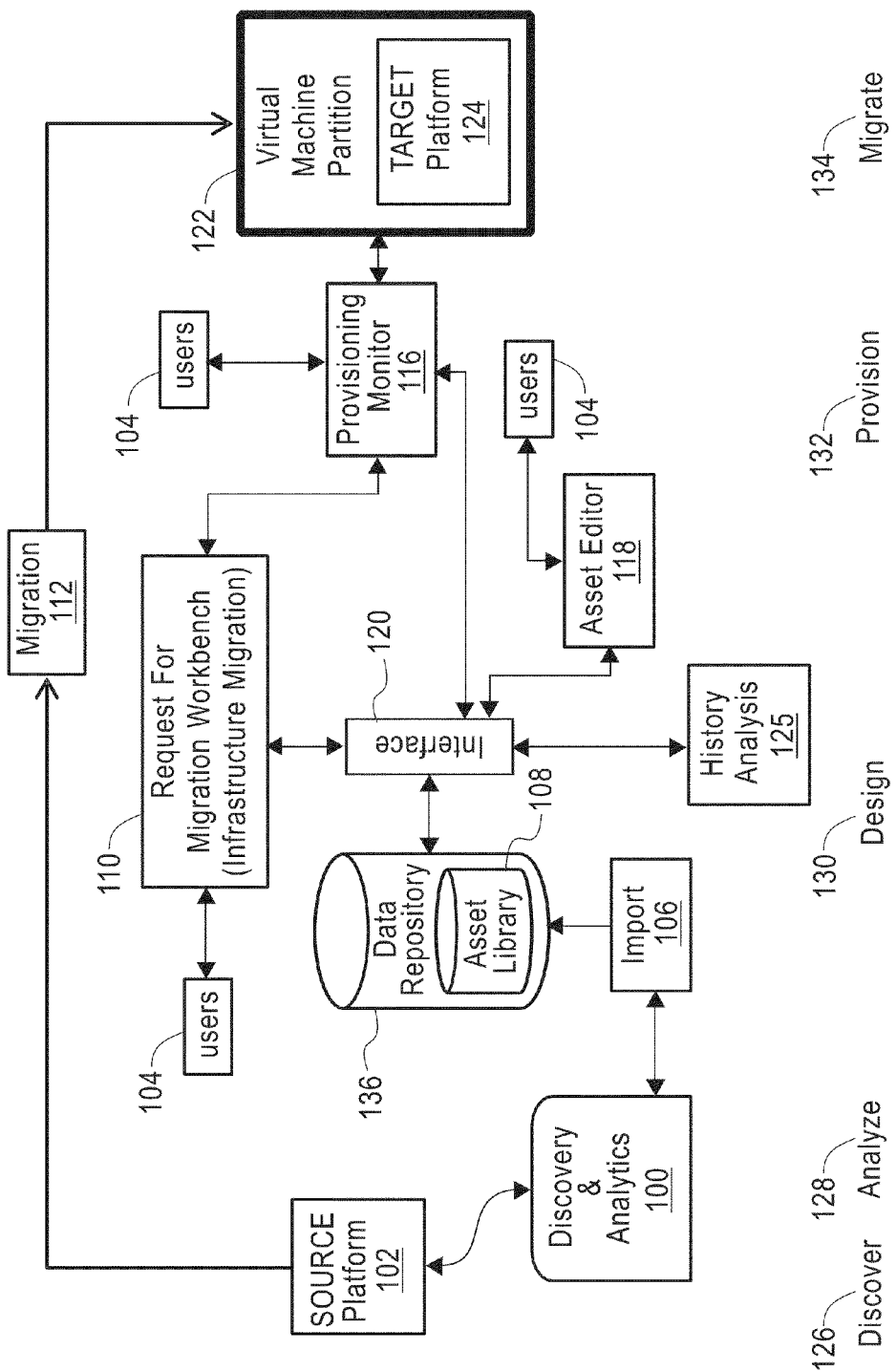
FIG. 1 illustrates a system diagram for performing a migration and consolidation of at least one server device and at least one source application in the at least one server device according to one embodiment of the present invention.

Software applications often have many dependencies. The software applications frequently rely on middleware and operating system(s) to reduce a complexity and coding effort to develop and test the applications. For example, an Internet shopping application may use a service of middleware, such as a standard web server like IBM® HTTP Server, to handle low-level functions such as dealing with a HTTP communications protocol. The same Internet shopping application may rely on a service of a standard database management system (DBMS) such as IBM® DB2® Enterprise Server to handle a data organization, retrieval, and optimization. The software applications may also have dependencies on hardware and hardware capacities. For example, the DBMS may require a minimum amount of a disk space. If the Internet shopping application has a dependency on the DBMS, the Internet shopping application would also have a dependency on the disk space.

According to one embodiment of the present invention, a prospective target platform refers to a sum of software and hardware which may be provisioned (i.e., prepared and/or configured) for a particular server device. A prospective target platform component refers to individual software, hardware, and/or other attribute of the hardware and/or software including, but not limited to: a physical location of the software and/or hardware, which may be provisioned for the particular server device. A (final) target platform component refers to individual dependency that the (final) target application has upon both hardware, software, and to other attributes of the hardware and/or software including, but not limited to: a physical location of the software and/or hardware.

A migration and consolidation of at least one server device and its source applications comprises six distinct stages: 1) Discovery, 2) Analysis, 3) Import, 4) Design, 5) Provisioning, and 6) Migration.

At the Discovery stage, a computing system (e.g., a computing system 1200 in FIG. 12) performing the migration and consolidation gathers information about the source platform. The computing system 1200 may gather the information in various ways, e.g., by a running of scripts to probe the source platform or by a use of an inventory management tool (e.g., IBM® Tivoli® Application Discovery and Dependency Manager) used to trace hardware and software deployment. Aiken, et al., "A process and system for comprehensive IT discovery without credential", U.S. patent application Ser. No. 12/485, 345, filed on Jun. 16, 2009, wholly incorporated by reference as set forth herein, describes the running a script to discover dependencies among IT resources.

At the Analysis stage, the computing system 1200 interprets gathered information at the Discovery stage, and renders the gathered information into a format that can be understood by a user. For example, the computing system 1200 generates a picture depicting dependencies and relationships between source platform components. An output of the Analysis stage is a list of the source platform components to be migrated.

At the Import stage, the computing system 1200 normalizes discovered data (i.e., the dependencies and/or the relationships among the source platform components). Since the discovered data may be in a variety of formats and may use a variety of notations and ontologies, the computing system 1200 reads the discovered data, and optionally converts the discovered data into a standard format and notation so that a further processing can be performed. The conversion may be unnecessary when the read discovered data complies with the standard format and notation.

At the Design stage, the computing system 1200 selects at least one prospective target platform component based on one or more of an evaluation of the source platform components, a requirement of the source application(s) and compatibility and affinity of the at least one prospective target component. For example, a business need of a user may require a choice of a target operating system to be an SLES (SUSE™ Linux Enterprise Server) 10 SP (Service Pack) 2, while the source application uses a database, e.g., IBM® DB2® version 9.5.0.2. The computing system 1200 running the Design stage may determine that a database DB2® Enterprise Server Edition, version 9.5.3a is compatible with the target operating system, e.g., by scanning a look-up table that stores compatibility information between operating systems and databases. However, if the user had chosen a target operating system SLES 9, the database DB2® Enterprise Server Edition, ver. 9.5.3a would not be permissible since the database DB2® Enterprise Server Edition, ver. 9.5.3a is not supported by SLES 9. At the Design stage, the computing system 1200 also collects a first metadata for the source and target platform components along with a second metadata concerning the migration and consolidation. Then, the computing system 1200 packages all these information (i.e., the first metadata and second metadata) into a standard format, which is called a Request for Migration (RFM) that can be provided as an input to a provisioning stage and migration stage. The RFM may be a data structure (e.g., an array, list, vector, stack) storing those information.

At the Provisioning stage, the computing system 1200 prepares and/or configures the target platform in accordance with the RFM. At the Migration stage, the computing system 1200 performs actual copying, testing, and activation of the source application in the target platform.

FIG. 1 illustrates a system diagram for preparing and/or performing a migration and consolidation of at least one source application to be migrated to or consolidated in at least one heterogeneous server device according to one embodiment of the present invention. The heterogeneous server device refers to a target platform having dissimilar or different configuration with respect to the source platform. At the Discovery 126 and Analysis 128 stages, a discovery and analytics tool 100 (e.g., IBM® Tivoli® Application Discovery and Dependency Manager) probes the source platform 102, e.g., by running a script on the source platform. According to one embodiment of the present invention an importing module 106 converts the discovered and analyzed data (i.e., an output of the discovery and analytics tool) into a standard format. In an alternative embodiment, the importing module 106 skips or avoids the conversion of the discovered and analyzed data into a standard format. In one embodiment, the importing module 106 operates based on properties files (i.e., files containing name/value pairs) (not shown) that are used to map the discovered and analyzed data to the standard format that can be used by the RFM at the Design stage. These properties files are also used to build dynamic SQL statements that may include directives with SQL "where" clauses and perform data type conversion(s). For example, the importing module 106 may be informed via the properties files that a field "memory size" in source platform data is represented as a unit of kilobytes and that a standard representation for this field should be a unit of megabytes. The properties files may further indicate that a standard location for the source platform data in a data repository (e.g., a data repository 136 in FIG. 1) may be a table named a "physical memory". Then, the importing module 106 converts a content of "memory size" from kilobytes to megabytes, e.g., by applying arithmetic division and rounding operations. A result of those operations is stored in the standard location "physical memory" by means of SQL statement(s).

A mapping properties file describes, but not limited to: a reference application, whether a new row in a host table (i.e., table listing host devices or server devices) needs to be created if a new server device is discovered during the discovery stage, a normalized database schema, a normalized database table, a discovery schema (i.e., dependencies and relationships between source platform components discovered during the Discovery stage, a discovery table (i.e., database tables discovered during the Discovery stage), an inserting mode (i.e., adding a new properties file) or updating mode (i.e., updating an existing properties file), a primary key of a particular table (a primary key of a table uniquely identifies a record or information in the particular table), a name of a column in the discovery table that the importing module 106 can use to find a server device or a foreign key (a foreign key identifies a column or a set of columns in a first table that references a column or a set of columns in a second table), a mapping of a column in the discovery table to a normalized column, a location in the operating system's directory structure where a mounted file system should appear (a directory structure refers to a virtual storage within a file system where computer files or folders are maintained and organized), an amount of space used by a file system and an indication that the contents in a source column name should be placed in a target column name (subject to any conversions that might be necessary), a unit to represent an amount of data, e.g., megabytes, and to be used as a conversion factor, and a unit conversion factor. For example, 1 KB is equal to 1024 BYTES, 1 MB is equal to 1024*1024 BYTES, and 1 GB is equal to 1024*1024*1024 BYTES, etc. The properties file also includes a support for data type conversion: "source column name_Units" indicates a quantity conversion factor. "where=FS_MOUNTPOINT, =, MOUNT_POINT" indicates that a WHERE clause for a dynamic SQL statement should be prepared in which the left-hand argument is normalized database column named FS_MOUNTPOINT, the operator of the WHERE clause is "=", and the right-hand argument is a column in the discovery table named MOUNT_POINT.

Filters may also be specified in the properties files in order to increase flexibility of the importing module 106 and reduce custom programming in the importing module 106. For example, a properties file may include these lines:
MW_CLASS.FILTER=EXCLUDE
MW_CLASS.FILTERVALUE.0=FS
MW_CLASS.FILTERVALUE.1=FSS
MW_CLASS.FILTERVALUE.2=BDEV
DISCOVERY_STATUS.FILTER=EXCLUDE
DISCOVERY_CLASS.FILTERVALUE=INFERRED
These filters cause rows in the discovery table where MW_CLASS is in 'FS', 'FSS' or 'BDEV' to be excluded from an import, and rows in which DISCOVERY_STATUS='INFERRED' to be also excluded from the import.

Returning to FIG. 1, in one embodiment of the present invention, the importing module 106 stores the standard format of discovered and analyzed data in a data repository 136. In one embodiment, the data repository 136 is a storage device such as a disk, optical disc, a flash memory drive, solid state drive, tape, etc. The data repository 136 stores information of, but not limited to: (1) the source platform and its components collected during the Discovery stage, (2) an inventory of available prospective target platforms and their components, (3) a compatibility and affinity between prospective target platform components, (4) the (final) target platform and their components and (5) metadata for RFM. In another embodiment, the data repository 136 is implemented, but is not limited to: a relational database or a collection of XML documents.

In a further embodiment, the data repository 136 includes an asset library 108 that stores the inventory of available prospective target platforms and their components and the compatibilities and affinities between prospective target platform components as a separate distinctive collection of data.

In a further embodiment, there is provided an interface 120 for the data repository 136. The interface 120 enables or allows an access to the data repository 136, e.g., by catching inbound requests received via a protocol including, but not limited to, HTTP, invoking appropriate actions against the data repository 136 and returning results (i.e., responses to the requests) via a protocol including, but not limited to, HTTP.

The interface 120 may store or retrieve the RFM in or from the data repository 136. In one embodiment, a user 104 creates the RFM, e.g., by using a text editor or XML editor.

An asset editor 118 is provided to allow the user 104 to populate and edit the inventory of available prospective target platforms and their components and the compatibilities and affinities between prospective target platform components stored in the asset library 108. The asset editor 118 may include a user interface (not shown) implemented by a web application, e.g., using JavaScript, static HTML or dynamic HTML.

In one embodiment, the web interface may access the data repository interface 120 directly. In a further embodiment, the web interface may access the data repository interface 120 by means of a proxy, including, but not limited to, a PHP application. PHP refers to a well-known scripting language used to produce a web application or dynamic web pages.

The asset editor 118 allows the user 104 to add, change, or delete information in the Asset Library 108 associated with the prospective target platform components and their attributes, including, but not limited to: a virtual machine and network components such as a logical partition (LPAR) 122 virtualized as a separate machine that hosts the final target platform 124, a network implementation such as a virtual switch (VSWITCH) to be used by the final target platform 124, an operating system (e.g., Microsoft® Windows®), a file system (e.g., FAT (File Allocation Table) used in Microsoft® Windows®), a file system type (e.g., disk file system, network file system, database file system, etc.), middleware, a software product (e.g., Microsoft® Office Suite), an installing method of the software product, a processor (e.g., IBM® PowerPC®), the number of processors, hardware architecture (e.g., the prospective target platform components and their interrelationship), a physical data center location, a functional classification (e.g., IT support for a particular organization, disaster recovery, backup, etc.) of the data center, a security classification (e.g., a top security protected by a biometric access) of the data center and a user (e.g., a user 104) of the final target platform.

In a further embodiment, the asset editor 118 allows the user 104 to add, change or delete information in the asset library 108 associated with bundling or grouping of the prospective target platform components, their attributes, and their affinities, including, but not limited to: (1) affinities between target platform users, operating systems, hardware architectures, file systems, and software products; (2) classifying the bundle with an identifier; and (3) the software products.

At the Design stage 130, the computing system 1200 provides the user 104 with a user interface 110 to design the RFM. In one embodiment, the user interface 110 is implemented by a web application, e.g., using JavaScript, static HTML, dynamic HTML or XML. The web interface (i.e., the user interface 110 implemented by a web application) may access the data repository interface 120 directly. In a further embodiment, the web interface accesses the data repository interface 120 by means of a proxy, including, but not limited to: a PHP application.

In one embodiment, the user interface 110 allows the user 104 to search the source platform based on search criteria. The search involves querying to the data repository 136 which will return a query result. In one implementation, the search criteria include, but are not limited to: an application group name (i.e., a name for server devices in a group). In a further embodiment, the search criteria include, but are not be limited to: a hostname (i.e., a unique name by which a device is known on a network) of a server device. The query result is returned from the data repository 136 to the user interface 110 in a form of a JavaScript Object Notation (JSON) array. JSON refers to a text format that that represents a data structure or array and that a human can easily read. JSON is also machine-friendly (i.e., a computer can easily parse and generate a JSON array).

In one embodiment, the user 104 selects a candidate source platform using the user interface 10. This selection causes the user interface 104 to query the data repository 136 and to display to the user 104 information of components in the selected source platform. The information includes, but is not limited to: a middleware name and version, network addresses of the selected source platform components, capacities of the selected source platform components and hostnames of the selected source platform components. For example, the user interface request http://boguser.boguspla-ce.ibm.com:8080/bogusapp/
JS.GetIntegratedConfig?alias=bogus.elsewhere.ib
m.com&hostid-3d9e80a5-b1da-402d-a6f2-71 db8ad6a2cb will cause multiple SQL select statements to be issued by the database interface, such as "SELECT schema.ip_alias.ipaddress FROM schema.ip_alias where UPPER(schema.ip_alias.alias)='BOGUS.ELSEWHERE.IBM.COM'". The result sets of these selects are accumulated and returned to the user interface in a JSON compliant form.

Having selected the candidate source platform, the user 104 is prompted to input details for a design of the RFM associated with the selected source platform. The user interface 110 presents to the user 104 a first option to migrate the source platform components in the selected source platform to the final target platform. The user interface 110 also presents to the user 104 a second option to modify attributes of those source platform components. Those source platform components include, but are not limited to: file systems, users, user groups, and middleware. The user interface 110 presents to the user 104 a third option to specify the final target platform components to be added to the final target platform. These final target platform components include, but are not limited to: file systems, users, user identifications, user groups, and middleware. The user interface 110 presents the user 104 a fourth option to remove one or more of the source platform components and/or their attributes and to migrate other source platform components and/or attributes (i.e., source platform components and/or attributes remained after the removal) to the final target platform. For example, the user interface 110 presents the user 104 a list of file systems existing on the selected source platform. The user 104 has an option to include any or all of those file systems in the design of the RFM. If the user 104 choose to migrate one or more of those file systems, the user interface 110 then provides the user 104 with an ability to change attributes of those file systems to be migrated. The user interface 110 may also provide an option to allow the user 104 to specify a completely new file system to be added to the design for the RFM.

In a further embodiment, the user interface 110 allows the user 104 to search and selects an existing RFM based on a search criterion. The user interface 110 further allows the user 104 to clone the selected RFM. The cloned RFM reduces the amount of data entry required by the user 104, e.g., by copying information associated with the selected source platform and the final target platform from the selected RFM into the cloned RFM.

In a further embodiment, the user interface 110 intelligently suggests configuration values of the final target platform components, e.g., by checking a minimum system, requirement of a new software component. For example if a user 104 specifies that the user 104 would like to add a new software component such as DB2® in the final target platform, then user interface 110 will automatically increase a file system size in the final target platform to accommodate the new software component. The user interface 110 also provides the user 104 with other information regarding the final target platform, including, but not limited to: hostnames of the target platform components.

In a further embodiment, the user interface 110 provides the user 104 with network and security information such as a Domain Name Server to be used and a firewall security level to be used for the final target platform. In a further embodiment, the user interface 110 provides the user 104 with information associated with business aspect(s) of the RFM, including, but not limited to: customer contact information.

In a further embodiment, the user interface 110 allows the user 104 to save their entries or inputs at any point during the Design stage 130, store those entries or inputs into the data repository 136, and allows the user 104 to retrieve the entries or inputs from the data repository 136 and to resume his/her process of designing the RFM.

The user interface 110 allows the user 104 to submit his/her design of the RFM to be stored into the data repository 136. In one embodiment, the user interface 104 checks the user's entries or inputs for a completeness and accuracy and notifies the user of any errors. If the user interface 110 detects no errors in the entries or inputs, the user interface 110 stores the design of the RFM in several tables (not shown) in the data repository 136. These tables include, but are not limited to: metadata associated with the design for the RFM including a unique identifier and a state of the RFM, data including unique identifiers of both the source and target platforms, information associated with the source platform components and information associated with the final target platform components.

Figure 7:
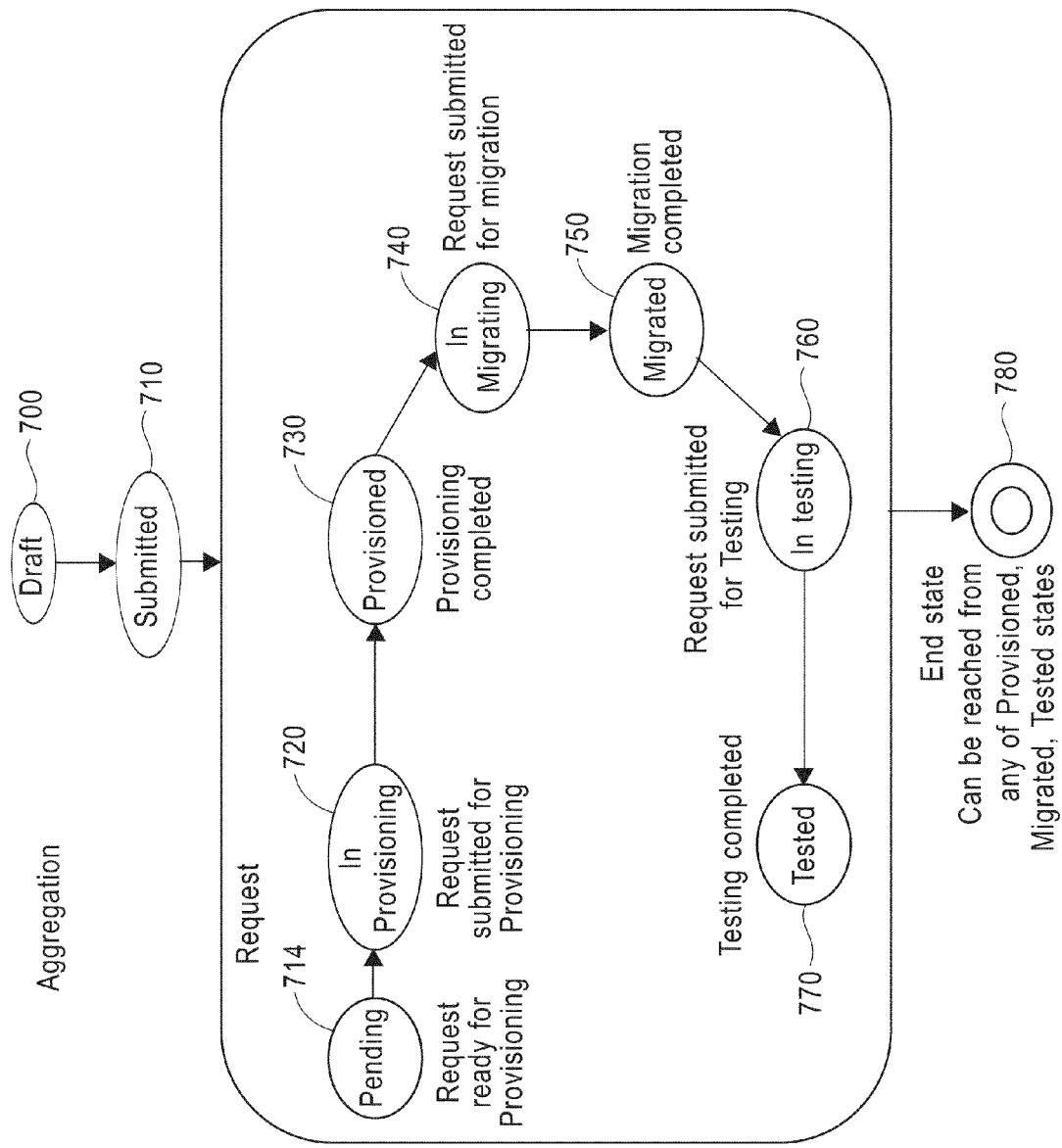
FIG. 7 illustrates a state transition diagram of a design stage according to one embodiment of the present invention.

In one embodiment, the user interface 110 may group two or more RFMs, e.g., based on grouping criteria such as a common source platform. Such a grouping is called an aggregation. The aggregation may include a unique identifier and a state of each RFM in the group. FIG. 7 illustrates a state transition diagram of the aggregation according to one embodiment of the present invention.

The users create or design one or more RFMs, e.g., by using the user interface 110. At step 700, the user interface 104 groups or bundles the RFMs based on a grouping criterion (e.g., bundling RFMs according to their creators). At step 710, the user interface 104 submits the grouped RFMs to the computing system 1200 that performs steps 714-780 and sets the state of each RFM in a submitted group to "pending". At step 714, the computing system 1200 invokes a provisioning manager or phase manager (i.e., a component that performs a preparation and configuration of the final target platform) to perform provisioning at step 720 according to the grouped RFMs that are in "pending" state. (The provisioning is described in detail below.) After completing the provisioning, at step 730, the computing system 1200 marks the grouped RFMs as "provisioned" indicating that the computing system 1200 finished the provisioning according to the grouped RFMs. At step 740, the computing system 1200 performs a migration according to the group RFMs. (The migration is described in detail below.) At completing the migration, at step 750, the computing system 1200 marks the grouped RFMs as "migrated" indicating that the computing system 1200 finished the migration according to the grouped RFMs. At step 760, the computing system 1200 conducts testing on the final target platform components which are migrated at the step 740. The testing includes, but is not limited to: a system compliance test (i.e., testing whether the final target platform satisfies the grouped RFMs) and integration test (i.e., testing for detecting an inconsistency between the final target platform components). At step 740, the computing system 1200 marks the grouped RFMs as "tested" indicating that the computing system 1200 finished the testing the final target platform built according to the grouped RFMs. At step 780, the computing system 1200 ends the provisioning and migration. In one embodiment, the computing system 1200 can selectively perform the provisioning (steps 720-730), the migration (steps 740-750) or the testing (steps 760-770). For example, the computing system 1200 only performs the provisioning by only running steps 720, 730 and 780. The computing system 1200 only performs the migration by only running steps 740, 750 and 780. The computing system 1200 only performs the testing by only running steps 760-780.

Returning to FIG. 1, in one embodiment, a history of each state transition (e.g., the Discovery and Analysis stage->the Design stage->the Provisioning stage->the Migration stage) is stored and written to a file or database table. This history is used as input to a subsequent performance analysis step 125 which measure the efficacy of the process and helps identify bottlenecks in the overall process.

At the Provisioning stage 132, the computing system 1200 provides a provisioning monitor 116 to allow the user 104 to retrieve the RFM from the data repository 136, to review the RFM, and to initiate and track a preparation and configuration of the final target platform based on specifications included in the RFM. Through the provisioning monitor 116, the user 104 monitors that prospective target platform components specified in the RFM are installed and equipped on the final target platform. The provisioning monitor 116 also acts as a user interface to an underlying component called provisioning manager (not shown) that performs the preparation and configuration of the final target platform. The provisioning manager retrieves RFMs from the data repository 136 that are grouped in an aggregation in the step 700 in FIG. 7 and ensures that the prospective target platform components specified by one or more of the RFMs are installed and configured on the final target platform.

The provisioning monitor 116 supports a submission of the RFM(s) through following phases: an Infrastructure phase, and a Platform phase. The infrastructure phase provisions (i.e., prepares and configures) an operating system, a file system, a user, a user group, and a network configuration as defined for the final target platform by the RFM(s). The platform phase installs middleware and/or software for the final target platform as per an instruction(s) in the RFM(s).

Figure 5A:
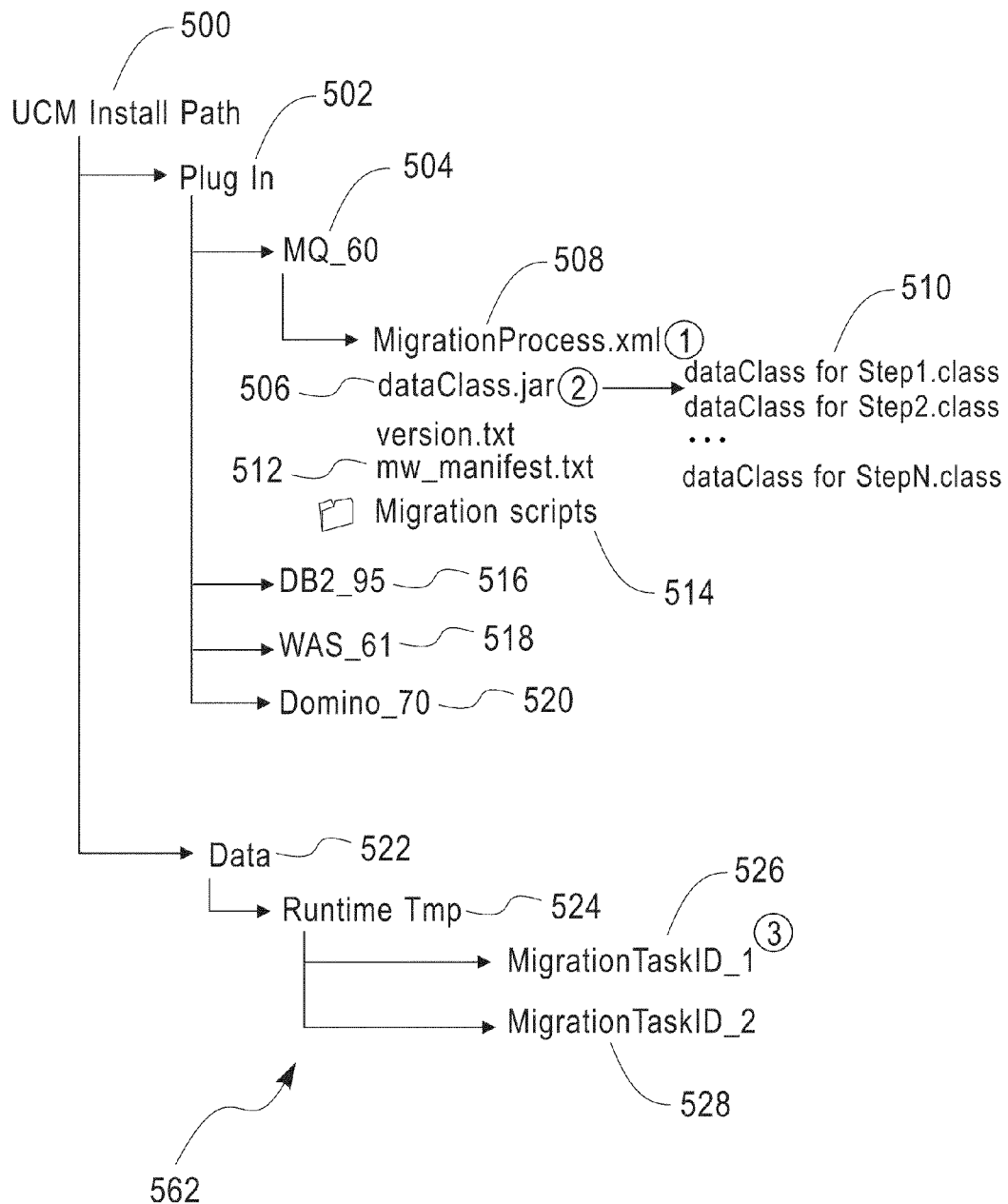
FIG. 5 illustrates a hierarchy and a flow chart for invoking a migration script based on a RFM (Request for Migration) according to one embodiment of the present invention.
Figure 5B:
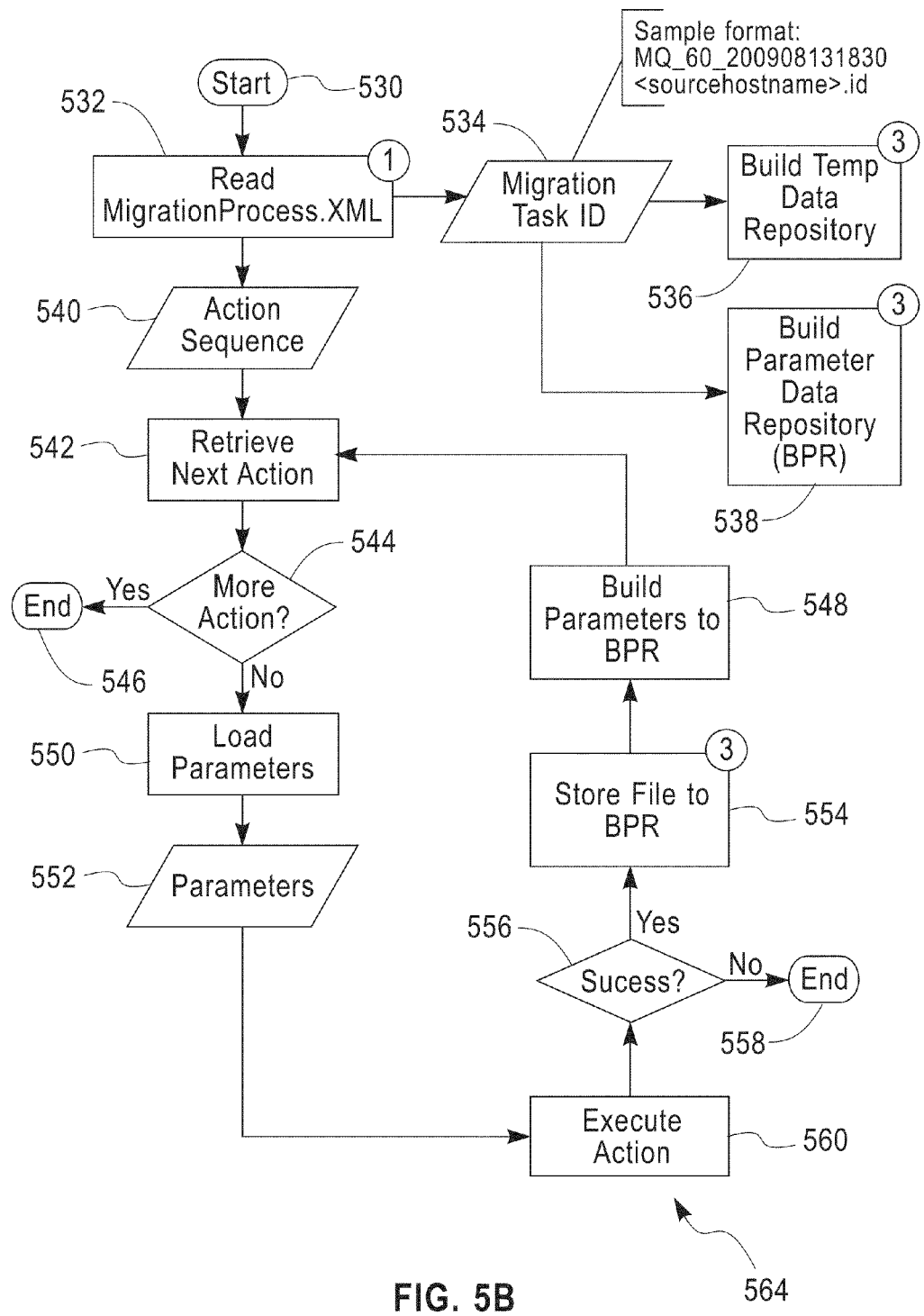

At Migration stage 134, the computing system 1200 configures the provisioned target platform components in accordance with information gleaned from source platform components, including but not limited to: a network port(s) associated with middleware, a middleware property (e.g., a middleware's dependency on a file system), and a middleware archive file. In one embodiment, migration performs this configuration by running at least one script devised specifically to handle particular middleware. A migration manager 112 runs the at least one script to perform the configuration. In one embodiment, the Migration Manager 112 interprets an XML document which specifies a particular instruction to be applied to the RFM. FIG. 5 illustrates a hierarchy and a flow chart for invoking a migration script based on a RFM (Request for Migration) according to one embodiment of the present invention.

A graphical hierarchy 562 in FIG. 5 depicts an exemplary installing method of diverse applications and/or middleware in the final target platform according to one embodiment of the present invention. At a top node 500 in the hierarchy 562, there exists a computing system 1200 operating the migration and consolidation process (i.e., the stages 126-134 in FIG. 1). The computing system 1200 invokes a component (e.g., plug-in 502) to install diverse applications and/or middleware such as IBM® WebSphere® MQ, IBM® WebSphere® Application Server, etc. The plug-in component 502 reads the XML document 508 including an installing instruction and at least one script 514 to configure a particular middleware 504 such as IBM® WebSphere® MQ. Per the instruction in the XML document 508 and/or a request(s) in the at least one script 514, the plug-in component 502 retrieves data stored in the data repository 136. The retrieved data include, but not limited to: model or version information of the particular middleware 512 and binary code 506 for the particular middleware 512. The binary code 506 may be a compressed format such as a jar file including N number of files 510. According to the instruction in the XML document and/or a request(s) in the at least one script 514, the plug-in component 502 sets up the particular middleware 512 in the final target, e.g., by running the binary code 506.

The plug-in component 502 may also set up other middleware such as a database 516 (e.g., IBM® DB 2®), an application server 518 (e.g., IBM® WebSphere® Application Server) and an email server 520 (e.g., IBM® Lotus® Domino®). When setting up each of these middleware, the plug-in component 502 may read each different XML document and run each different script.

In a further embodiment, the computing system 1200 may store data 522 necessary to install middleware in a temporary data repository. The temporary data repository may be a partition of the data repository 136. Necessary data 522 includes, but not limited to: the at least one script 514, the model or version information 512, the XML document 508, and the binary code 506. In a further embodiment, the computing system 1200 separately stores the data 522 per each migration task (e.g., a first task 526 installing the particular middleware 504 on the final target platform, a second task 528 installing the database 516 on the final target platform, etc.).

A flow chart 564 in FIG. 5 illustrates method steps for installing diverse applications and/or middleware in the final target platform according to one embodiment of the present invention. At step 530, the migration manager 112 initiates the Migration stage 134. At step 532, the migration manager 112 reads the XML document 508. At step 534, the migration manager 112 creates a migration task ID for the particular middleware 504. For example, the migration task ID for the particular middleware 504 is a combination of a name of the particular middleware and date and time of the Migration stage initiation. At step 536, the migration manager 112 stores the necessary data 522 in the temporary data repository. In a further embodiment, the migration manager 112 stores parameters (e.g., minimum system requirement for installing the particular middleware 504) in a parameter data repository. The parameter data repository may be a partition of the data repository 136.

At step 540, the migration manager 112 reads instructions (actions) described in the XML document 508. At step 542, the migration manager 112 selects an instruction among the instructions. The migration manager 112 may utilizes a scheduling algorithm (e.g., a first-come first-served) when selecting an instruction. At step 544, the migration manager 112 checks whether the selected instruction depends on other instructions that have been not processed or requires other instructions that have not been processed. If the selected instruction depends on other instructions not processed or requires other instructions not processed, the migration manager 112 aborts processing of instructions in the XML document 508. Otherwise, at step 550, the migration manager 112 retrieves the stored parameters from the parameter data repository. At step 552, the migration manager 112 checks whether the selected instruction complies with the parameters. If the selected instruction does not comply with the parameters, the migration manager 112 aborts processing of the selected instruction. Otherwise, at step 560, the migration manager 112 performs the selected instruction.

At step 556, the migration manager 112 checks whether the selected instruction is successfully performed. If the selected instruction is not successfully performed, at step 558, the migration manager 112 aborts rest of processing of instructions in the XML document 508. Otherwise, at step 554, the migration manager 112 stores a file in the parameter data repository. That file may include, but not limited to: the successfully performed instruction and data indicating that the selected instruction is successfully performed. At step 548, the migration manager 112 stores the retrieved parameters in the parameter data repository. At step 542, the migration manager 112 selects a next instruction in the XML document and runs steps 542-560 until all instructions in the XML are processed.

Returning to FIG. 1, after completing the Migration stage 134, the source platform 102 moves to the final target platform running on the virtual machine 122 (or a logical partition of a virtual machine).

Figure 2:
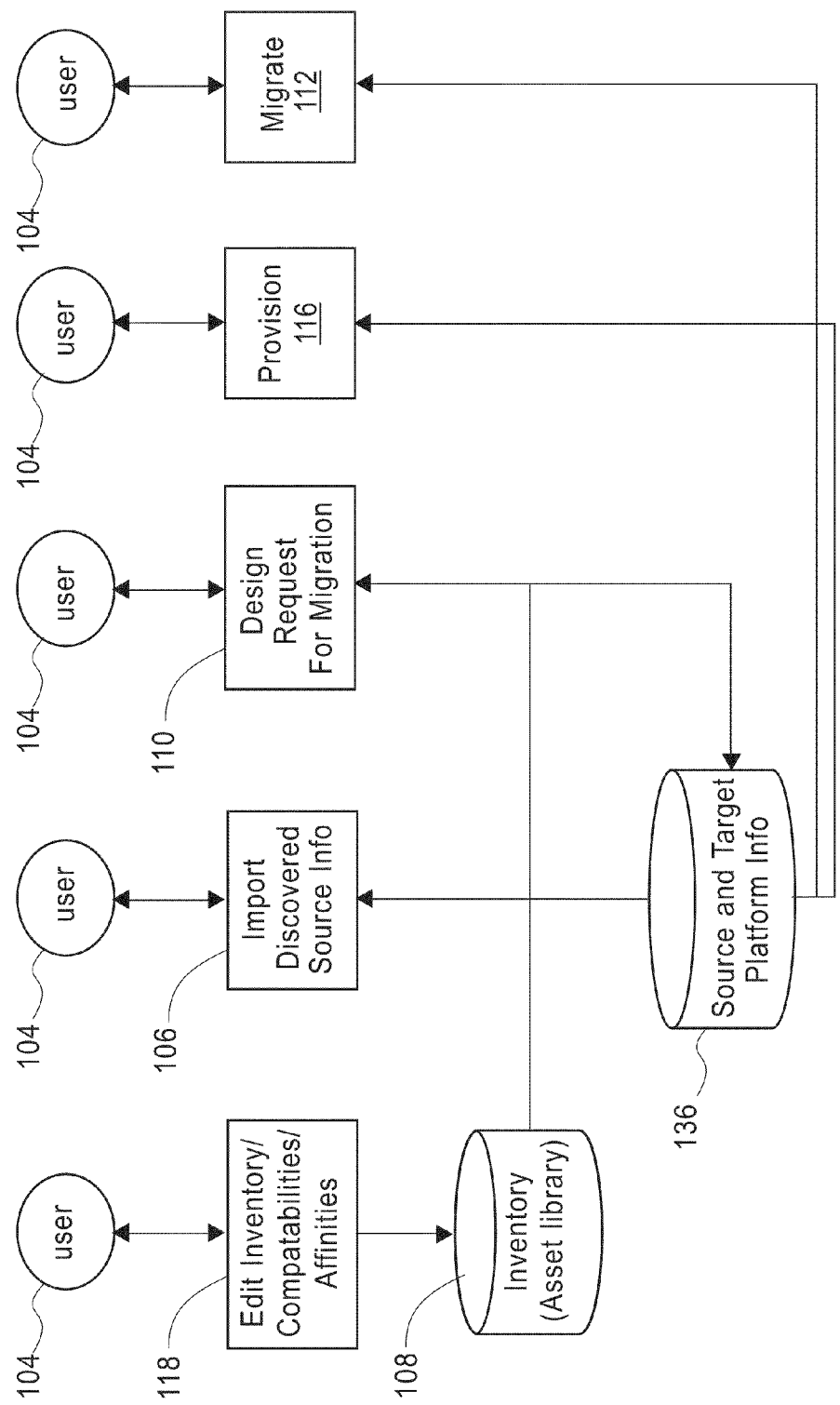
FIG. 2 illustrates a diagram including six main components of the present invention according to one embodiment.

FIG. 2 illustrates a diagram including six main components of the present invention according to one embodiment. The user 104 communicates with one or more of: the asset editor 118, the importing module 106, the user interface 110, and the provisioning monitor 116 through a network such as Internet. The asset editor adds, changes, or deletes data (e.g., inventory of available prospective target platform) in the asset library 108. The importing module 106 coverts the discovered and analyzed data (e.g., source platform and final target platform information) into a standard format (e.g., a spreadsheet). The user interface 110 assists the user 104 to design the RFM. The user interface 110 provides the user 104 with a direct access to the asset library 108. Thus, the user 104 may retrieve data (e.g., inventory of available prospective target platform) stored in the asset library 108 via the user interface 110. The user interface 110 also presents the user 104 several options (e.g., an option for modifying attributes of a source platform component, another option for migrating a source platform component to the final target platform, etc.) associated with the source and final target platform. The provisioning monitor 116 allows the user to initiate and track a preparation and configuration of the final target platform based on specifications included in the RFM.

Figure 3:
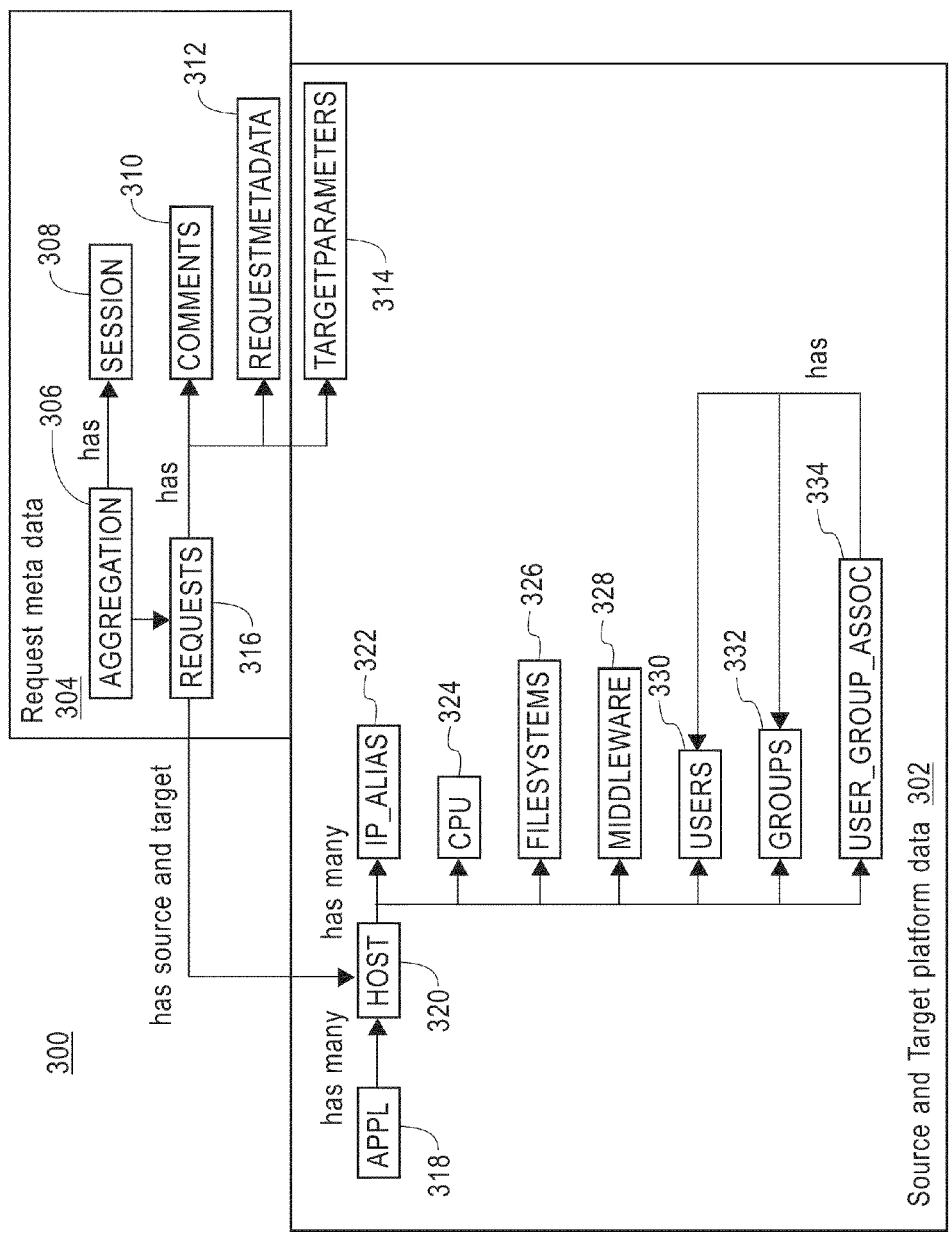
FIG. 3 illustrates an exemplary entity relationship between metadata associated with the aggregation and data associated with the source and target platform according to one embodiment of the present invention.

FIG. 3 illustrates an exemplary entity relationship between metadata 304 associated with the aggregation and data 302 associated with the source and target platform according to one embodiment of the present invention. An entity relationship diagram 300 describes how data, applications, and/or server devices are correlated with each other. In one embodiment, the entity relationship diagram 300 depicts relationships among data stored in the data repository 136. In one embodiment, the computing system 1200 creates the entity relationship diagram 300, e.g., by parsing and analyzing the RFM, dependencies, compatibilities, and affinities between the source platform components, and dependencies, compatibilities, and affinities between the target platform components. The entity relationship diagram 300 includes, but not limited to: the metadata 304 associated with the RFM and aggregation and data 302 associated with the source and target platform. The metadata 304 illustrates relationships between the aggregation 306, a migration task 308 (e.g., a task installing the particular middleware 504 on the final target platform) and the RFM 316. For example, the aggregation 306 has a plurality of migration tasks 308. The aggregation may include a plurality of RFMs. The RFM 316 may include at least, one comment or instruction 310, metadata regarding the RFM itself (e.g., a creation of the RFM) 312, and parameters 314 stored in data 302. In one embodiment, the parameters 412 refer to parameters stored in the parameter data repository.

The data 302 illustrates relationships between an application 318, server devices 320 and components (e.g., CPUs 324, file systems 326, etc.). For example, the application 318 runs on a plurality of server devices 320. A server device includes, but not limited to: a plurality of IP (Internet Protocol) addresses 322, a plurality of CPUs 324, a plurality of file systems, a plurality of middleware 328, a plurality of users 330, a plurality of user groups 332 and a plurality of user group associations 334. A user group association includes at least one user and at least one user group.

The entity relationship diagram 300 may further illustrate interrelationship between the metadata 304 and the data 302. For example, the RFM 316 stored in the metadata 304 has the parameters 314 included in the data 302. The RFM 316 also has at least one source server device 320 (i.e., a server device running on the source platform) and at least one target server device 320 (i.e., a server device running on the target platform).

Figure 4:
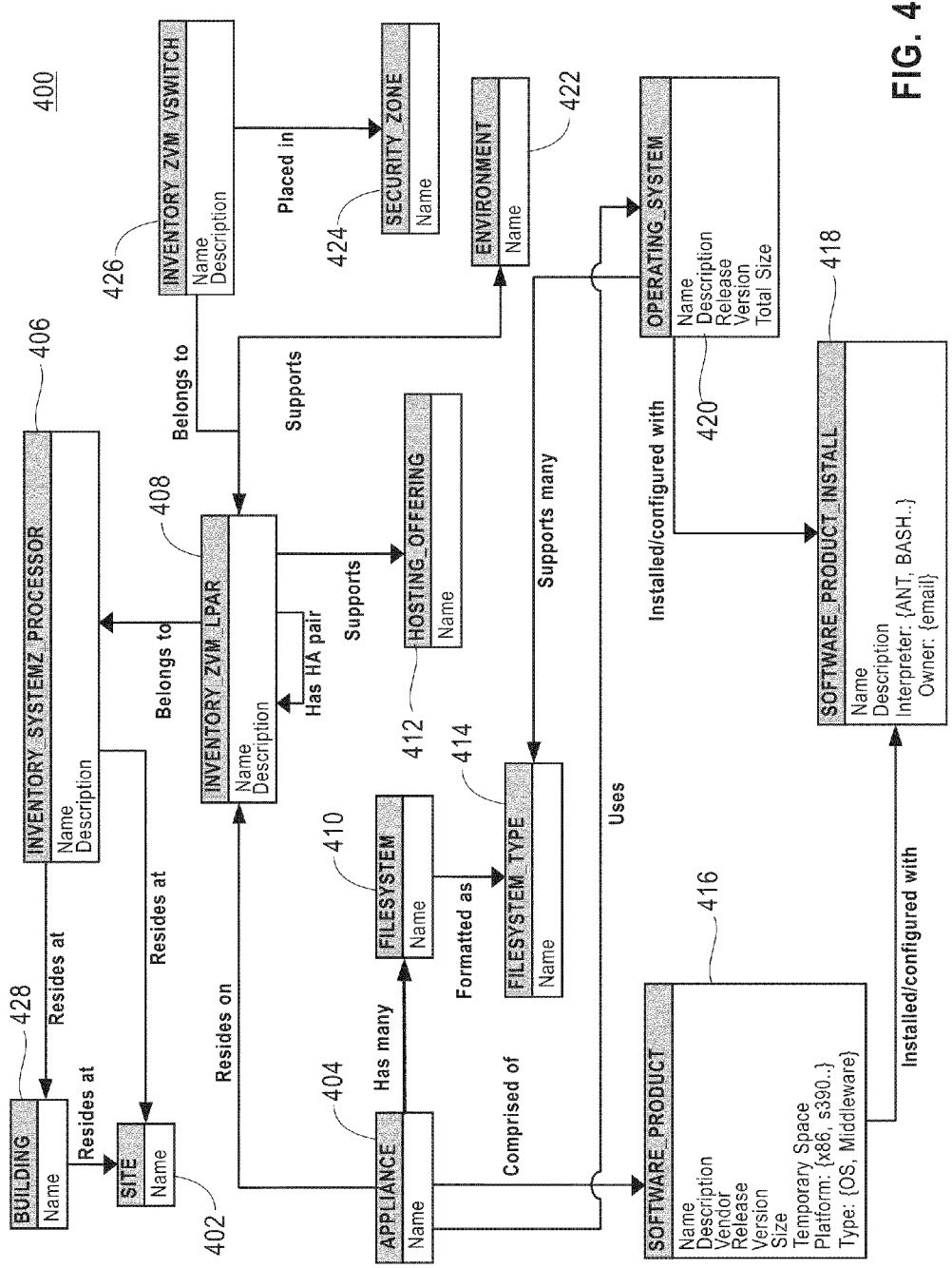
FIG. 4 illustrates an entity relationship diagram of an asset library according to one embodiment of the present invention.

FIG. 4 illustrates an object relationship diagram (ORD) associated with an asset library according to one embodiment of the present invention. Objects described in this ORD 400 include, but are not limited to: a logical partition 408 virtualized as a separate machine (e.g., a virtual machine partitioned 122), a computing device 406, a physical location 402 of the computing device 406, a virtual switch 426 to be used by the final target platform, a security classification 424 of the virtual switch 426, an environment 422 that the logical partition 408 supports, a server application 412 running on the logical partition 408, appliances or applications 404 running on the logical partition 408, a file system 410, a file system type 414 of the file system 410, an operating system 420, a software product 416 from which the appliances or applications 404 are obtained, and an installing method 418 of the software product 416.

The ORD 400 illustrates relationships between these objects. For example, each logical partition has its name and brief description of it. Some logical partitions have high availability (HA) pairs. The HA refers to a fault-tolerant system (i.e., a system detecting failed nodes and reconfiguring the logical partition to work properly while avoiding the failed nodes). The logical partition 408 belongs to the computing device 406. The data center 406 has its name and a brief description about it. The computing device 406 may reside at a specific building 428 having a specific name. The specific building 428 may reside at a particular site 402 having a particular name. Alternatively, the ORD 400 may represent that the computing device 402 reside at the particular site 402. The logical partition 408 supports the host offering or server application 412 running on the logical partition 408. Each server application has its name. The logical partition 408 supports the environment 422 (e.g., a client/server environment, cloud computing environment, etc.). The cloud computing refers to a computing environment where a scalable and/or virtualized resource is provided as a service over Internet. Each computing environment has its name.

The virtual switch 426 belongs to the logical partition 408. Each virtual switch has its name and a brief description about it. The virtual switch 426 operates in a specific security zone or security level 424 having a specific name. The appliance or application 404 resides on the logical partition 408. Each appliance or application 404 has its name. The appliance or application 404 depends on a plurality of file systems 410 having their names. The file system(s) 410 uses the file system type 414 (e.g., FAT) having its name. The operating system 420 supports the plurality of file systems 410. The appliance or application 404 uses the operating system 420. The operating system 420 has its name, a brief description about it, a release date of it, version information of it, and a total size (e.g., 100 MB) of it.

The appliance or application 404 comprises the software product 416, which includes its name, its description, its vendor, its release date, its version, its size, its temporary space (i.e., a space needed to install the software product), its platform and its type (e.g., an operating system, middleware, etc.). The software product 416 is installed or configured with the installing method 418. The installing method 418 includes its name, its description, its creator (owner) and its interpreter. The interpreter refers to a program that reads inputs provided from a user and transforms the inputs in a context of the operating system 418 or the logical partition 408. The operating system 420 is also installed or configured according to its installing method or the installing method 418.

Figure 6:
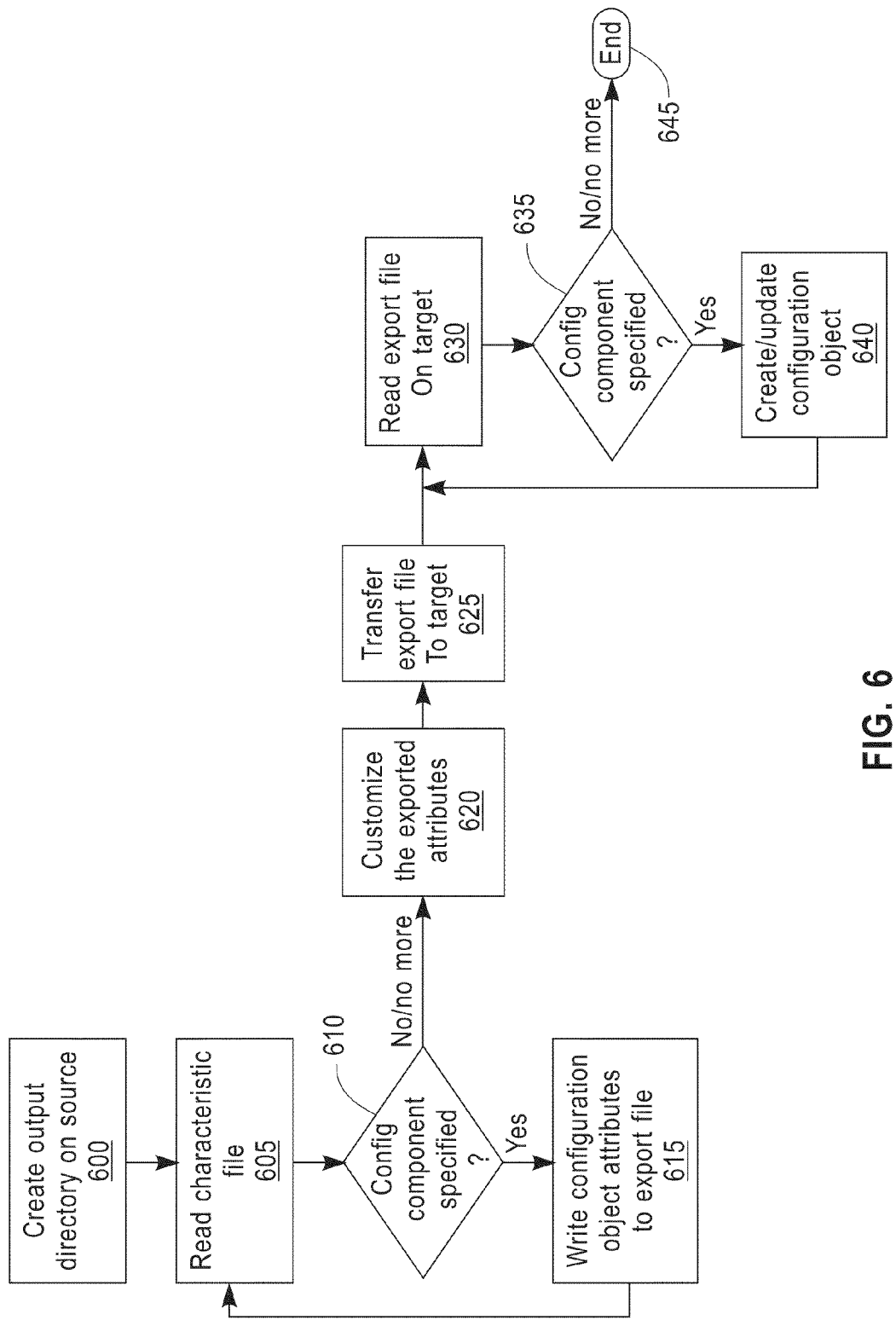
FIG. 6 illustrates a flow chart describing method steps for the Migration stage according to one embodiment of the present invention.

FIG. 6 illustrates a flow chart describing method steps for the Migration stage according to one embodiment of the present invention. The migration manager 112 imports configurations and applications from the source platform and exports the configurations and applications to the final target platform. The migration manager 112 must be installed on the source and target platforms.

The migration manager 112 can perform a number of tasks, which are specified by the user 104. As inputs to the script (i.e., the at least one script run by the migration manager 112), there are a plurality of characteristic files including appropriate options, depending on which tasks (e.g., a task for transferring data to the target platform, a task for creating configurations and applications on the target platform, etc.) are performed. A characteristic file is described in detail below.

On the source platform, the user 104 must have an administrator credential. On the target platform, the user 104 must have an administrator credential. On the source and target platforms, the user 104 must be logged in as an OS (Operating System) user that has a read access to a directory in the source platform where the characteristic files are stored.

At step 600 in FIG. 6, the computing system 1200 creates a first directory in the source platform. The first directory includes files that are specific to a particular migration task (e.g., a task for migrating a database). The computing system 1200 can copy everything in that first directory from the source platform to the target platform.

The computing system 1200 may use the script written in a scripting language (e.g., Perl, JavaScript, etc.) to operate the migration manager 112. This script accepts an input option from a characteristic file and/or a command line. The input option includes, but not limited to: what tasks to run in the migration manager 112 and which systems are being used as the source and target platforms.

At step 605, the migration manager 112 reads the characteristic file. The migration manager 112 uses the characteristic file as an input. The migration manager 112 presents to the user 104 an option to run with and to export configuration information for the target platform. The migration manager 112 can accept more than one characteristic files as inputs. When there is more than one characteristic file, a first value specified for a particular option will be the one that is used. For instance, if you have a characteristic file "options1.properties" that has an option "myOption=one", and another characteristic file "options2.properties" that has an option "myOption=two", and you specify the option as "-optionsFiie options1.properties, options2.properties", then a value of "myOption" will be "one". The migration uses this technique, by passing updated variables both in an inputted characteristic file and an outputted characteristic file to change information such as a cell (i.e., a processor), node (i.e., a computer), and server names, etc.

The characteristic file gives all parameters to run the migration manager 112 with. This characteristic file is specified by a parameter to the script. Any of options in the characteristic file can also be specified on a command line, which will take precedence over a same option specified in the characteristic file. A first characteristic file used to specify how the migration manager 112 should operate describes, but is not limited to: which task will the migration manager 112 will perform, a subdirectory where all created data will be placed, whether the migration manager 112 performs a configuration on the target platform, whether the migration manager 112 installs an application on the target platform and a file including exported data and the first characteristic file. The first characteristic file may include several sections of options that are extracted into separate characteristic files for the underlying utility.

A second characteristic file includes characteristics about the middleware software on the source and target machines as follows. The second characteristic file includes, but not limited to: a directory where the source platform resides, a directory where the configuration information of the source platform resides, a username of the user 104 to access the middleware on the source platform, and a password of the user 104 to access the middleware on the source platform. The second characteristic file specifies source platform information that the migration manager 112 needs. The migration manager 112 may use some options from this file. The target platform may have a similar file.

Upon entering the Migration stage 134, the computing system 1200 creates a directory in the source platform for the migration manager 112, copies the migration manager 112 to the directory where the migration manager 112 is installed and resided, and copies appropriate input characteristic files for the migration manager 112. The computing system 1200 runs several tasks.

Then, the computing system 1200 exports configuration data of the source platform into a characteristic file that includes the configuration data. The computing system 1200 also exports application configuration data into a characteristic file that includes the application configuration data.

Once these exporting tasks are finished, the exported data and a main characteristic file (e.g., the first characteristic file described above) are compressed into a file whose name is specified in the first characteristic file. This compressed file eventually is copied to the target platform.

Returning to FIG. 6, at step 610, the migration manager 112 checks whether there is a component to be configured on the target platform. The computing system 112 writes one or more export files that describes how to configure the component on the target platform. The computing system 1200 repeats steps 605-615 until there is no more component to be configured on the target platform. There is a first section in the second characteristic file which describes the characteristics for processing the export step. This first section in the second characteristic file describes, but not limited to: a file describing configuration data to be exported from the source platform, an objects to be exported from the source platform, objects to be disregarded while performing the export of the objects, whether a default setting is skipped or not, whether the export of the objects is skipped if there is no object to export and whether scopes of variables (e.g., a global variable or local variable) are valid.

A first export file describes configuration data to be exported from the source platform to the final target platform.

This first export file describes objects to be exported, variables to be exported, cells to be exported, nodes to be exported and servers to be exported. This first export file may be copied, modified by the migration manager 112, and then used as an input to a step 640 in FIG. 6. (The step 640 is described in detail below.)

There is a second section in the second characteristic file that specifies how a task for exporting applications is run by the migration manager 112. The second section describes, but not limited to: a file describing configuration data to be exported from the source platform, applications exported from the source platform to the target platform, applications to be disregarded while performing the export of the applications, whether a default setting is skipped or not, whether the export of the objects is skipped if there is no objects to export, and whether scopes of variables (e.g., a global variable or local variable) are valid.

There is a second export file described in the first characteristic file. This second export file describes application data (e.g., variables, application, application deployment option etc.) to be exported from the source platform to the target platform. This first export file may be copied, modified by the migration manager 112, and then used as an input to the step 640 in FIG. 6.

Returning to FIG. 6, at step 620, the computing system 1200 customizes attributes of the source platform application and/or attributes (e.g., variables) in the export file(s). At step 625, the computing system 1200 transfers the export files from the source platform to the target platform. In one embodiment, the computing system 1200 copies the compressed file (i.e., the compressed file described in the first characteristic file) from the source platform to the target platform. At step 630, the migration manager 112 reads the export file(s).

Upon receiving and/or reading the export files including configuration and application data of the source platform, the migration manger 112 creates a mapping file that specifies necessary updates when migrating from the source platform to the target platform.

This mapping file also specifies necessary changes between the source and target platforms. The necessary changes includes, but not limited to: what is a new cell, a new node, and a new server name; what machine the new cell or new node runs on; and what server a database is now located on. This mapping file further includes entries that may need to be changed. After creating the mapping file but before performing the migration from the source platform to the target platform, the mapping file needs to be updated with the change(s). A change is indicated by adding a literal value ">>>" after an old value in the mapping file, followed by a new value. For example, to change a cell name, an entry in the mapping file may look like the following:

```
# Cell - bogusNode02Cell
   Cell.bogusNode02Cell.name=bogusNode02Cell>>>targetCell
```

The mapping file addresses one or more of: a cell/node/server/cluster name, a database management system (e.g., IBM® DB2®) and a system (e.g., IBM® WebSphere® MQ) for messaging across multiple platforms.

If a name of a cell (i.e., a processor), node, server, or cluster changes between the target and the source platforms, then the mapping file specifies the new names. The migration manager 112 creates variables for these new names. The following is an exemplary variable file:

```
# Variables
@VAR_VARIABLES=@VAR_CELL,@VAR_NODE_bogusNode02,@VAR_SERVER_server1
@VAR_CELL=bogusNode02Cell
@VAR_NODE_bogusNode02=bogusNode02
@VAR_CLUSTER_dlwCluster1=dlwCluster1
@VAR_CLUSTER_dlwCluster2=dlwCluster2
@VAR_NODE_dlwesterNode01=dlwesterNode01
@VAR_NODE_dlwesterNode02=dlwesterNode02
@VAR_SERVER_dlwClus1Srvr1=dlwClus1Srvr1
@VAR_SERVER_dlwClus1Srvr2=dlwClus1Srvr2
@VAR_SERVER_dlwesterNode01_server1=server1
@VAR_SERVER_dlwesterNode02_server1=server1
@VAR_SERVER_webserver1=webserver1
```

The "@VAR_VARIABLE" lists variables included in the variable file. The "@VAR_CELL" refers to a cell where a new name is going to be assigned. The "@VAR_NODE_" refers to a node where a new name is going to be assigned. The "@VAR_SERVER_" refers to a server where a new name is going to be assigned. The "@VAR_CLUSTER" refers to a cluster where a new name is going to be assigned.

Then, the migration manager 112 updates these variables (e.g., bogusNode02Cell). There can be more than one server with a same name. When more than two server names are the same, then node names differentiate the servers having the same name (e.g., @VAR_SERVER_dlwesterNode01_server1=server1 and @VAR_SERVER_dlwesterNode02_server1=server4

For example, the mapping file entries to deal with cell/server/node/cluster names may look like as follows:

```
# Cell - bogusNode02Cell
   Cell.bogusNode02Cell.name=bogusNode02Cell>>>targetCell
```

For example, a cell name is being changed from "bogusNode02Cell" to "targetCell".

```
# Node - bogusNode02
   Node.bogusNode02.hostName=bogus.elsewhere.ibm.com
   Node.bogusNode02.name=bogusNode02>>>targetNode
```

For example, a node name is being changed from "bogusNode02" to "targetNode".

```
# Server - server1
   Server.server1.node=bogusNode02
   Server.server1.name=server1>>>targetServer
```

A server name is being changed from "server1" to "target-Server".

In an exemplary embodiment, if the source platform uses a type 2 JDBC (Java® Database Connectivity API; software enabling a Java® application to communicate with a database) driver, then the source platform may not have a corresponding server name and port number, because the database is cataloged locally on a DBMS (Database Management System; e.g., IBM® DB2®) client. If both the source and target platforms use the type 2 JDBC drivers, then no changes need to be made to the source platform. However, if one of them changes the driver type from the type 2 JDBC driver to a type 4 JDBC driver or the source platform already uses the type JDBC 4 driver and the database moves, then a server name and port number of the target platform change to match a new location of the database. Entries in the mapping file to handle database changes may look like the following:

```
# DataSource - DlwTestDs
DataSource.DlwTestDs.serverName=dlwester.elsewhere.ibm.com>>>newserver
DataSource.DlwTestDs.name=DlwTestDs
DataSource.DlwTestDs.type=DB2
DataSource.DlwTestDs.portNumber=50000>>>newport
DataSource.DlwTestDs.databaseName=dlwdatabZ
DataSource.DlwTestDs.driverType=4
```

These entries change a name of a server running a database from "dlwester.elsewhere.ibm.com" to "newserver" and change a port number from 50,000 to "newport".

A location of the Database Management System (DBMS), specifically the JDBC driver, may change from the source platform to the target platform. The location of the JDBC driver can either be specified in configuration data exported from the source platform or in a variable in the export file. The following describes exemplary location change of the DBMS:

```
# VariableSubstitutionEntry - DB2UNIVERSAL_JDBC_DRIVER_PATH
VariableSubstitutionEntry.DB2UNIVERSAL_JDBC_DRIVER_PATH.symbolicName=DB2UNIVE
RSAL_JDBC_DRIVER_PATH
VariableSubstitutionEntry.DB2UNIVERSAL_JDBC_DRIVER_PATH.@scope=Cell=dlwesterC
ell01:Node=dlwesterNode01
VariableSubstitutionEntry.DB2UNIVERSAL_JDBC_DRIVER_PATH.value=C:/SQLLIB/java>
>>/opt/ibm/db2/java
```

In this example, the JDBC driver location is changed from "C:/SQLLIB/java" to "/opt/ibm/db2/java".

System (e.g., IBM® WebSphere® MQ) for messaging across multiple platforms: if the messaging system moves during the migration, then updates are made to parameters associated with the messaging system. The parameters are changed from the first export file in the first characteristic file. The following describes exemplary parameter changes in the first export file:

```
# MQConnectionFactory - DlwMqCF
MQConnectionFactory.DlwMqCF.channel=DLW.MQ.CHANNEL
MQConnectionFactory.DlwMqCF.host=dlwester.elsewhere.ibm.com>>>newhost
MQConnectionFactory.DlwMqCF.port=1400>>>1401
MQConnectionFactory.DlwMqCF.queueManager=DLW.MQ.QMGR
```

A host name is changed from "dlwester.elsewheredbm.com" to "newhost". A port number is changed from "1400" to "1401".

Returning to FIG. 6, at step 635, the migration manager 112 checks whether there is a component to be configured on the target platform. If there is no component to be configured, at step 645, the migration manager 112 completes the migration. Otherwise, at step 640, the migration manager 112 creates or updates the component on the target platform. The migration manager 112 reads the export file including configuration and application data created on the source platform, uses the changes in the mapping file, and creates new file including the configuration and application data and the changes. The migration manager 112 imports the new file to the target platform. The migration manager 112 performs all necessary work to prepare the target platform for the importing. The importing may create a directory, copy the component(s) to be configured from the source platform to the target platform, install the component(s) on the target platform, and copy appropriate characteristic files from the source platform to the target platform. The migration manager 112 runs the steps 630-640 until there are no more components to be configured on the target platform.

The importing performs updating of configuration data for the target platform and updating of application data for the target platform. The updating of configuration data creates or modifies configuration data in the characteristic files from the source platform. This updating of configuration data is based on the export file and the changes in the mapping file. The updating of the application data install or modify application data in the characteristic files. This updating of the application data is based on the export file and the changes in the mapping file. Once the importing is finished, the updated configuration and application data have been applied to the target platform.

The first characteristic file describes a first updating file that includes, but not limited to: a name of the first updating file, configuration data not to be updated, an option to save the updated configuration data, an option to synchronize the updating with the first export file from the source platform and/or the mapping file, whether an update on configuration data creates a new file or replaces an existing file, what the migration manager 112 would do in a case of that configuration data to be updated is not found, what the migration manager 112 would do in a case of that configuration data to be deleted is not found, a template used to denote a server device or server application, actions to be taken before updating the configuration data, and actions to be taken after updating the configuration data.

The first characteristic file further describes a second updating file that includes, but not limited to: a name of the second updating file, application data not to be updated, an operation or performance to be taken by the migration manager 112, a directory where this file (updateAppls.import file) is stored, an option to save the updated application data, an option to synchronize the updating with the export file from the source platform and/or the mapping file, whether an update on application data creates a new file or replaces an existing file after installing the component(s) at step 640, what the migration manager 112 would do in a case of that application data to be updated is not found, and what the migration manager 112 would do in a case of that application data to be deleted is not found.

Figure 8:
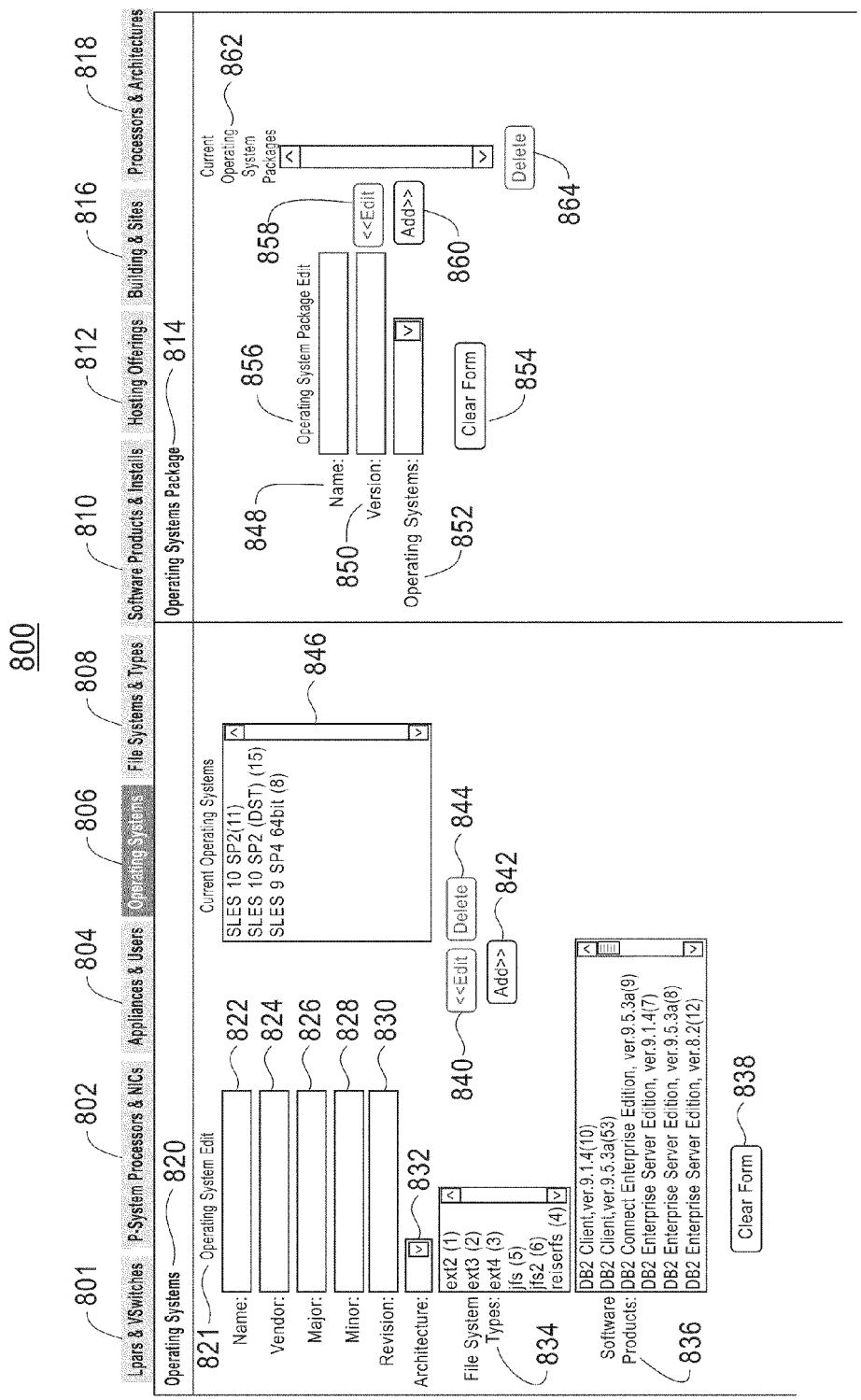
FIG. 8 illustrates a user interface for editing operating system(s) and middleware affinity(s) included in the asset library according to one embodiment of the present invention.

FIG. 8 illustrates a user interface 800 for editing operating system(s) and middleware affinity(s) included in the asset library 108 according to one embodiment of the present invention. The asset editor 118 provides the user 104 with the user interface 800 to assist the user 104 to edit data (e.g., data associated with the logical partition and virtual switch, etc.) stored in the asset library 108. The user interface 800 comprises a plurality of tabs including, but not limited to: a logical partition and virtual switch tab 801 (i.e., a tab for assisting the user 104 to edit data associated with the logical partition 408 and virtual switch 426), a computing device tab 802 (i.e., a tab for assisting the user 104 to edit data associated with the data center 406, an appliance and user tab 804 (i.e., a tab for assisting the user 104 to edit data associated with the appliance or application 404 or its user), an operating system tab 806 (i.e., a tab for assisting the user 104 to edit data associated with the operating system 420), a file system and type tab 808 (i.e., a tab for assisting the user 104 to edit data associated with the file system 410 and the file system type 414), a software product and installing method tab 810 (i.e., a tab for assisting the user 104 to edit data associated with the software product 416 and the installing method 418), the server application tab 812 (i.e., a tab for assisting the user 104 to edit data associated with the hosting offering or server application 412), a building and site tab 816 (i.e., a tab for assisting the user 104 to edit data associated with the building 428 and the site 402), and a processor and architecture tab 818 (i.e., a tab for assisting the user 104 to edit data associated with the processor and hardware architecture).

Upon selecting one of these tabs, the user can edit data associated with the selected tab. For example, upon selecting the operating system tab 806, the user 104 can edit operating systems 820 and/or operating system package 814 (i.e., a package including several operating systems). Under an operating system edit menu 821, the user 104 can enter or modify one or more of the name 822 of the operating system 420, a vendor 824 of the operating system 420, a major feature (e.g., compatibility with middleware) 826 of the operating system 420, a minor feature (e.g., a graphical enhancement) 828 of the operating system 420, a revision number 830 of the operating system 420, and a required processor architecture 832 (e.g., Intel x86) of the operating system 420. Furthermore, the user 104 can select a file system type supported in the operating system 420 via a first drop-down menu 834. The user can select a software product supported in the operating system 420 via a second drop-down menu 836. By clicking a clear button 838, the user can erase his/her entries and selections. At the third drop-down menu 846, the user 104 chooses an operating system to be edited 840 or deleted 844. By clicking an add button 842, the user can add a new operating system in the third drop-down menu 846.

Under an operating system package edit menu 856, the user can enter or modify a name 848 of the operating system package 814 and a version 850 of the operating system package 814. The user can select an operating system in the package 814 through a fourth drop-down menu 852. Under a scroll-bar menu 862, the user can select an operating system package to be edited 858 or deleted 864. The user can also enter a new operating system into the menu 862, e.g., by entering 856 and pushing an "add" button 860.

Figure 9:
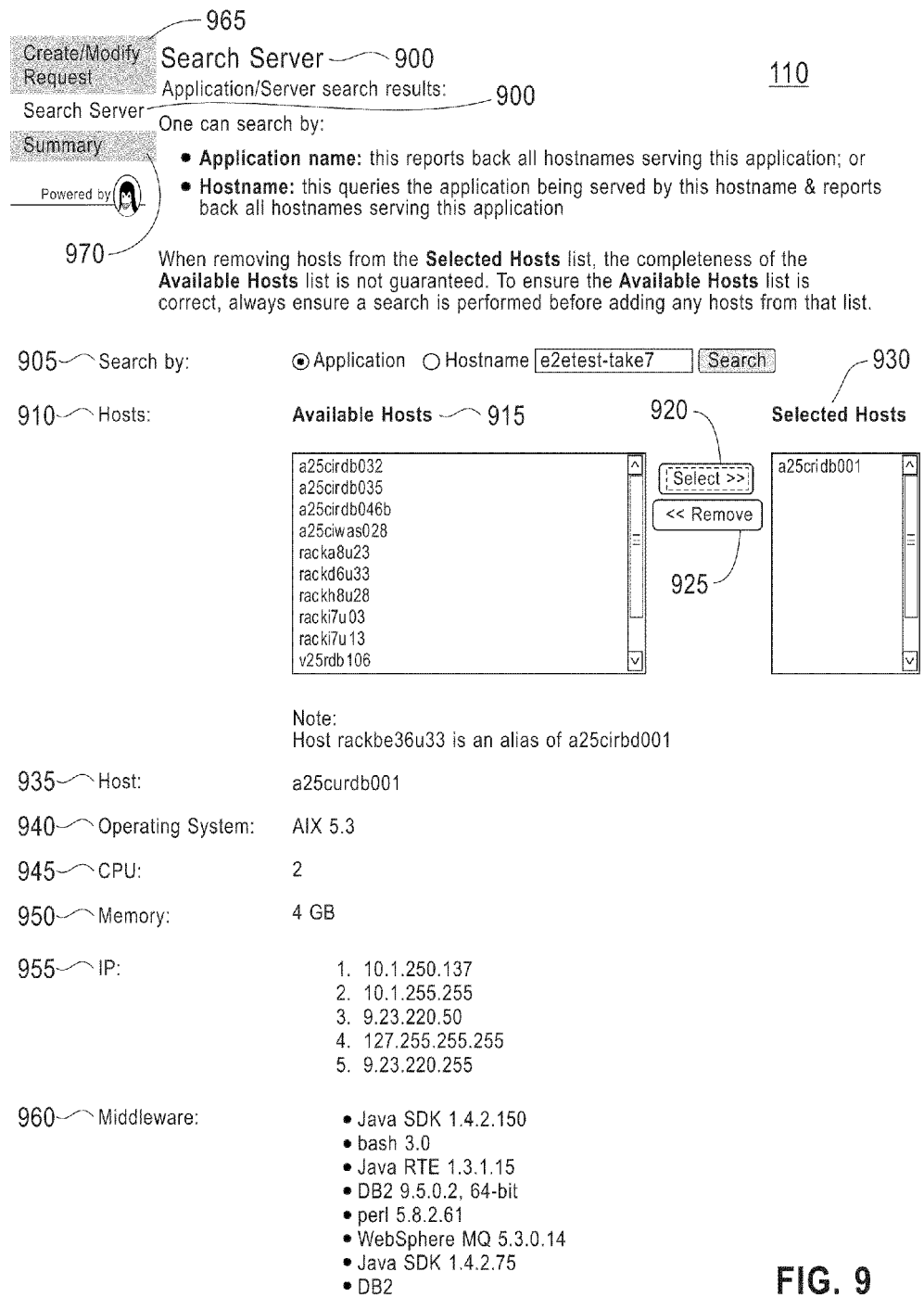
FIG. 9 illustrates a user interface for selecting a source platform and its components according to one embodiment of the present invention.

FIG. 9 illustrates a user interface 110 for selecting a source platform and its components according to one embodiment of the present invention. The user interface 110 presents the user 104 a first menu 965 to create or modify the RFM 965, a second menu 900 to search a source platform 900 and a third menu 970 to summarize the RFM 970. Upon selecting the menu 900, the user can search 905 a source platform (i.e., a server device), e.g., by using an application name or a server device name. When the user 104 selects the search using the application name, the user interface 110 presents the user 104 all server names serving an application having that application name. When the user 104 selects the search using the server device name, the user interface 110 sends to the data repository 136 a query asking a particular application served by a server device having that server device name and another query asking all server devices serving that particular application. Upon receiving query results, the user interface 110 presents the user 104 all the server device names serving that particular application.

The user interface 110 presents these server device names in a first window 915. Upon clicking a particular server device listed in the first window 915 and then pushing "Select" button 920, the particular server device becomes a selected source platform to be migrated or consolidated. The user 104 interface 110 lists the selected source platform(s) in a second window 930. The user 104 can select one or more server device among the server devices listed in the first window 915. Then, any selected server device becomes a source platform to be migrated or consolidated. It is recommended that the user conduct the search 905 before selecting a server device in the first window 915. Removing a selected source platform in the second window 930 may affect a completeness of available source platforms.

The user interface 110 also provides the user 104 components of the selected source platform. For example, the user interface 110 presents one or more of: an alias 935 of the selected source platform component, an operating system 940 of the selected source platform component, the number of processors 945 in the selected source platform component, a memory capacity 950 in the selected source platform component, IP addresses 955 of the selected source platform component, and middleware 960 depending on or installed on the selected source platform component.

Figure 10:
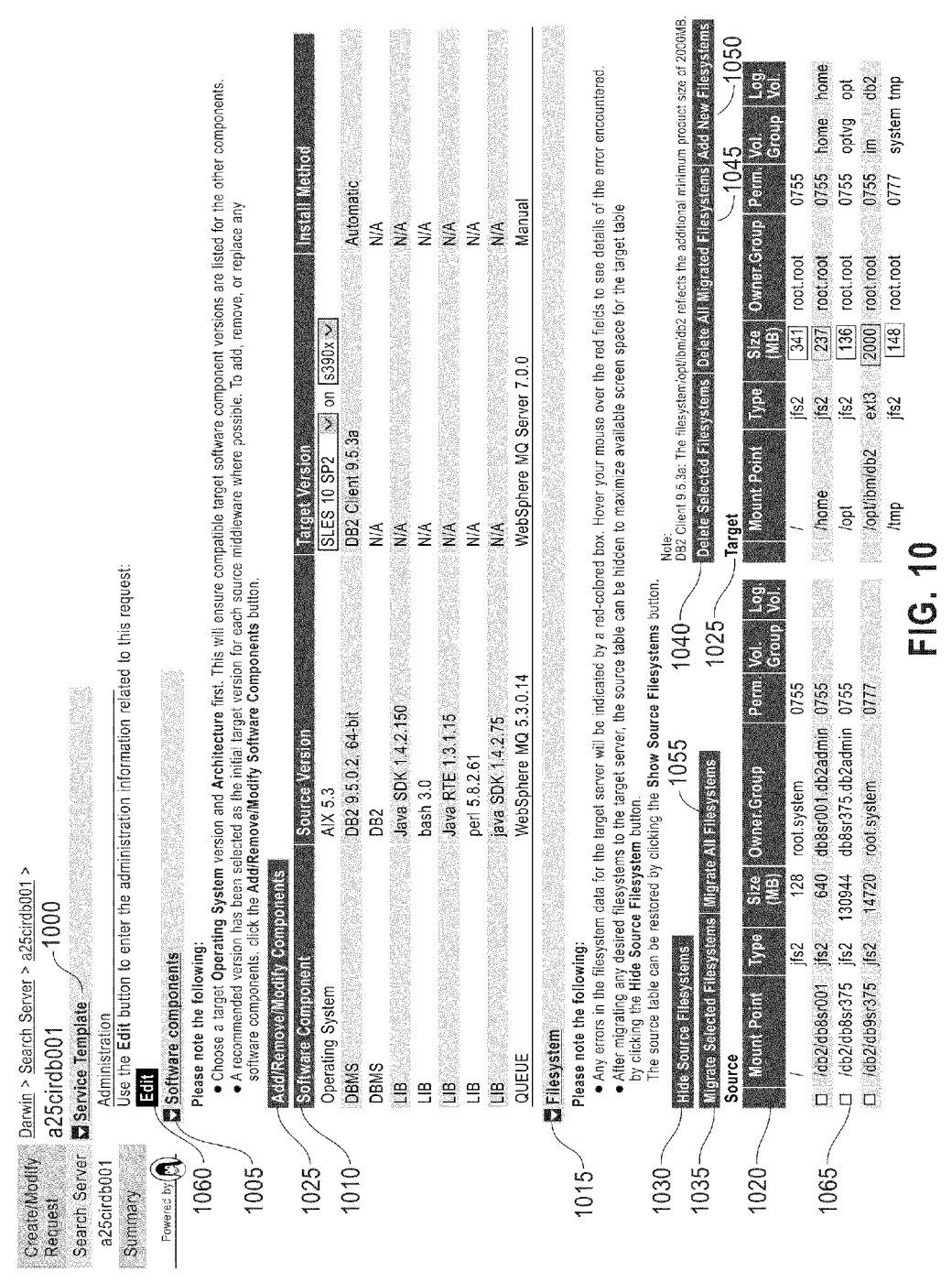

FIG. 10 illustrates a user interface for designing a RFM according to one embodiment of the present invention. The user interface 110 provides the user 104 a user-friendly interface 1000 to design or create a RFM. The interface 1000 allows the user to modify software components 1005, file systems 1015 and hardware components (not shown). After the user 104 chooses an operation system and hardware architecture for the target platform, the interface 1000 lists all compatible software components in a table 1010. By default, the interface 1000 lists a recommended software component for each middleware component. For example, the table 1010 lists DB 2® for a database after the user selects an operation system SLES10 SP2 and hardware architecture S390X. S390X refers to a physical system design of computer components developed by IBM. However, the user can add, remove, or modify the software components listed in the table 1010, e.g., by clicking an "add/remove/modify software components" button 1025.

A source table 1020 lists file systems on the source platform. By clicking a "Hide Source Filesystems" button 1030, the interface 1000 removes the table 1020. The user 104 can migrate all or parts of the file systems on the source platform to the target platform, e.g., by clicking a "Migrate All Filesystems" button 1055 or checking a box (e.g., a box 1065) and clicking a "Migrate Selected Filesystems" button 1035. A target table 1025 lists file systems on the target platform. The user can modify file systems on the target platform, e.g., delete selected file systems 1040, delete all migrated file systems 1045 or add a new file system 1050.

The user 104 can also edit administrative information regarding the RFM being designed or created, e.g., by clicking the edit button 1060. Then, a pop-up window (not shown) appears to allow the user to enter or modify the administrative information.

Figure 11:
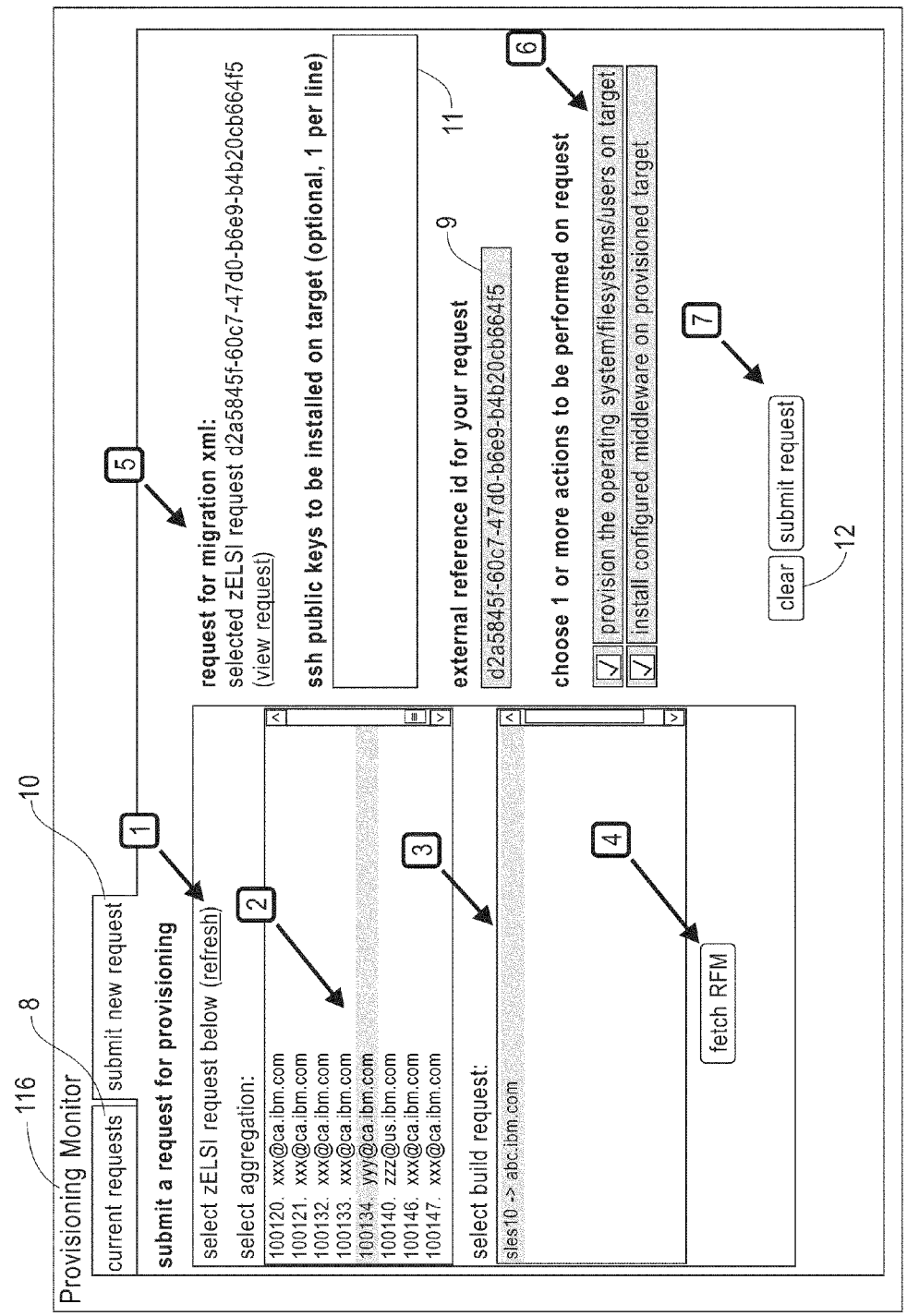
FIG. 11 illustrates a user interface for a provision stage according to one embodiment of the present invention.

FIG. 11 illustrates a user interface for the provisioning monitor 116 according to one embodiment of the present invention. The provisioning monitor 116 presents at least two options: a first option 8 to monitor a current RFM and a second option 10 to submit a new RFM. Under the second option 10, the provisioning monitor 116 allows the user to select an aggregation (i.e., aggregated RFMs) or a single RFM in a window 2. The provisioning monitor 116 allows the user 104 to refresh the window 2, e.g., by clicking a refresh button 1. In a window 3, the provisioning monitor 116 presents RFM(s) that can be built or realized on the target platform. After the user selects a RFM in the window 3 and/or a RFM in the window 4, the user 104 fetches the selected RFM(s), e.g., by clicking a "fetchRFM" button 4. The provisioning monitor allows the user 104 view the fetched RFM(s), e.g., by presenting a menu 5 that displays the fetched RFM(s) in XML format.

The provisioning monitor 116 presents the user 104 an option 11 that implements SSH (Secure Shell) network protocol in the target platform. The SSH protocol may require a public key for an encryption and/or decryption. The SSH protocol allows data to be exchanged using a secure communication channel between two devices. In one embodiment, the fetched RFM(s) has corresponding external reference ID(s) 9. The external reference ID(s) includes, but not limited to: a project name, a user name, etc. The provisioning monitor 116 presents options 6 to the user 104: an option for provisioning an operating system, a file system and the user on the target platform and another option for configuring and installing middleware on the target platform. The user 104 can submit 7 these entries (e.g., SSH public key, external reference ID, selected options 6, etc.). The user 104 can also erase these entries, e.g., by clicking a "clear" button 12.

In one embodiment, the discovery and analysis tool 100, the importing module 106, the data repository interface 120, the user interface 110, the asset editor 118, the provisioning monitor 116 and the migration manager 112 are implemented in hardware or reconfigurable hardware, e.g., FPGA (Field Programmable Gate Array) or CPLD (Complex Programmable Logic Device), using a hardware description language (Verilog, VHDL, Handel-C, or System C). In another embodiment, the discovery and analysis tool 100, the importing module 106, the data repository interface 120, the user interface 110, the asset editor 118, the provisioning monitor 116 and the migration manager 112 are implemented in a semiconductor chip, e.g., ASIC (Application-Specific Integrated Circuit), using a semi-custom design methodology, i.e., designing a chip using standard cells and a hardware description language. Thus, discovery and analysis tool 100, the importing module 106, the data repository interface 120, the user interface 110, the asset editor 118, the provisioning monitor 116 and the migration manager 112 are implemented on the hardware, reconfigurable hardware or the semiconductor chip.

Figure 12:
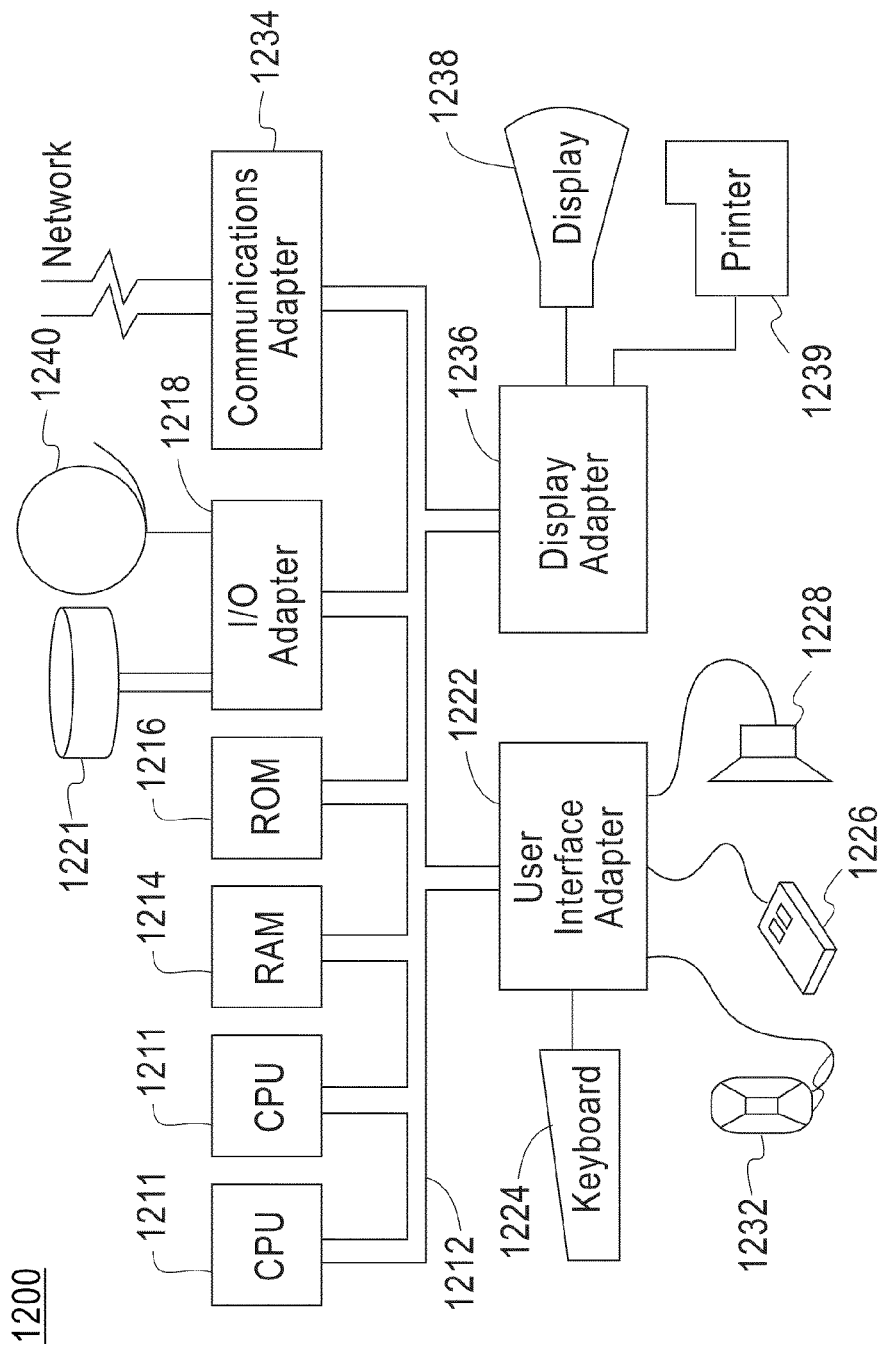
FIG. 12 illustrates an exemplary hardware configuration for performing a migration and a consolidation of at least one server devices and their applications according to one embodiment of the present invention.

FIG. 12 illustrates an exemplary hardware configuration of a computing system 1200 running and/or the discovery and analysis tool 100, the importing module 106, the data repository interface 120, the user interface 110, the asset editor 118, the provisioning monitor 116 and the migration manager 112. The hardware configuration preferably has at least one processor or central processing unit (CPU) 1211. The CPUs 1211 are interconnected via a system bus 1212 to a random access memory (RAM) 1214, read-only memory (ROM) 1216, input/output (110) adapter 1218 (for connecting peripheral devices such as disk units 1221 and tape drives 1240 to the bus 1212), user interface adapter 1222 (for connecting a keyboard 1224, mouse 1226, speaker 1228, microphone 1232, and/or other user interface device to the bus 1212), a communication adapter 1234 for connecting the system 1200 to a data processing network, the Internet, an Intranet, a local area network (LAN), etc., and a display adapter 1236 for connecting the bus 1212 to a display device 1238 and/or printer 1239 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions runnable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for preparing a migration and consolidation of at least one source application to be migrated to or consolidated in at least one heterogeneous server device, the method comprising:

selecting at least one prospective target platform component based on one or more of: an evaluation of at least one source platform component and a requirement of the at least one source application, wherein the source platform component referring to an individual dependency that the at least one source application has upon hardware, software or at least one attribute of the hardware and software, the prospective target platform component referring to an individual software, hardware or attributes of the individual software and hardware to be provisioned for the at least one server device;

collecting first metadata of the at least one source platform component and the at least one prospective target platform component;

exporting configuration data of the at least one source platform component into a characteristic file which describes the configuration data to be exported from the at least one source platform component to the at least one prospective target platform component;

creating a mapping file corresponding to the characteristic file, the mapping file specifying one or more changes from the at least one source platform component to the least one prospective target platform component;

collecting second metadata associated with the migration and consolidation, the collected second metadata including: the characteristic file and the mapping file; and preparing and configuring a final target platform based on the first metadata and the second metadata, the preparing and the configuring the final target platform including: modifying the configuration data in the characteristic file according to the mapping file and applying the modified configuration data to the final target platform, the final target platform referring to a sum of dependencies a final target application has upon hardware or software, the final target application referring to an application that exists after the migration and consolidation, wherein a processor coupled to a memory device perform steps of: selecting, collecting the first metadata, collecting the second metadata, preparing, configuring, automatically determining, and automatically adjusting.

2. The computer-implemented method according to claim 1 further comprises one or more of:

discovering information of source platform, the source platform referring to a sum of dependencies a source application has upon software or hardware, the source application referring to an application in the at least one server device to be migrated or consolidated; and packing the first metadata and the second metadata into a RFM (Request For Migration) data structure specifying the at least one selected prospective target platform component, the first metadata and the second metadata.

3. The computer-implemented method according to claim 2 further comprises:

providing an interface for allowing a user to design the RFM data structure.

4. The computer-implemented method according to claim 3, wherein the interface performs steps of:

allowing the user to search the source platform based on a search criterion;

presenting the user a first option to migrate the at least one source platform component to the final target platform without a modification;

presenting the user a second option to modify attributes of the at least one source platform component; and presenting the user a third option to specify at least one final target platform component to be added to at least one final target platform, the at least one final target platform referring to an individual dependency that the final target application has upon.

5. The computer-implemented method according to claim 1 further comprises:

choosing the at least one prospective target platform component based on a compatibility and an affinity of the at least one prospective target platform component; and providing a data repository for storing information of one or more of: at least one source platform and the at least one source platform component, the at least one source platform referring to a sum of dependencies that the at least one source application has upon hardware or software, an inventory of at least one prospective target platform and the at least one prospective target platform component, the at least one prospective target platform referring to a sum of software and hardware to be provisioned for the at least one server device, the compatibility and the affinity of the at least one prospective target platform component, and the final target platform and at least one final target platform component, the at least one final target platform referring to an individual dependency that the final target application has upon.

6. The computer-implemented method according to claim 5, wherein the data repository further comprises:
an interface for enabling an access to the data repository by catching inbound requests received via a protocol and invoking actions against the data repository.

7. The computer-implemented method according to claim 5 further comprises:
providing an asset library for storing the inventory of at least one prospective target platform, the at least one prospective target platform component and the compatibility and the affinity of the at least one prospective target platform component.

8. The computer-implemented method according to claim 7 further comprises:
providing an asset editor for allowing a user to populate or edit the inventory of at least one prospective target platform, the at least one prospective target platform component and the compatibility and the affinity of the at least one prospective target platform component.

9. The computer-implemented method according to claim 8, wherein the asset editor further performs:
adding, changing or deleting information in the asset library associated with the at least one prospective target platform components and attributes of the at prospective target platform components.

10. The computer-implemented method according to claim 9, wherein the added, changed or deleted information in the asset library comprises one or more of:
a virtual machine and network components virtualized as a separate machine, a network implementation, an operating system, a file system, a file system type, middleware, a software product, an installing method of the software product, a processor, hardware architecture, a physical data center location, a functional classification of the data center, a security classification of the data center, a user of the final target platform.

11. The computer-implemented method according to claim 2, wherein the preparing and configuring further comprises steps of:
ensuring the at least one selected prospective target platform component specified by the RFM data structure is installed and equipped on the final target platform.

12. The computer-implemented method according to claim 2, wherein the preparing and configuring supports a submission of the RPM data structure thorough steps of:
provisioning at least one operating system, at least one file system, at least one user, at least one user group, at least one network configuration as defined for the final target platform by the RFM data structure; and
installing middleware and software for the final target platform according to at least one instruction in the RFM data structure.

13. A computer-implemented system for preparing a migration and consolidation of at least one source application to be migrated to or consolidated in at least one heterogeneous server device, the system comprising:
a memory device; and
a processor unit in communication with the memory device, the processor unit performs steps of:
selecting at least one prospective target platform component based on one or more of: an evaluation of at least one source platform component and a requirement of the at least one source application, wherein the source platform component referring to an individual dependency that the at least one source application has upon hardware, software or at least one attribute of the hardware and software, the prospective target platform component referring to an individual software, hardware or attributes of the individual software and hardware to be provisioned for the at least one server device;
collecting first metadata of the at least one source platform component and the at least one prospective target platform component;
exporting configuration data of the at least one source platform component into a characteristic file which describes the configuration data to be exported from the at least one source platform component to the at least one prospective target platform component;
creating a mapping file corresponding to the characteristic file, the mapping file specifying one or more changes from the at least one source platform component to the least one prospective target platform component;
collecting second metadata associated with the migration and consolidation, the collected second metadata including: the characteristic file and the mapping file; and
preparing and configuring a final target platform based on the first metadata and the second metadata, the preparing and the configuring the final target platform including: modifying the configuration data in the characteristic file according to the mapping file and applying the modified configuration data to the final target platform, the final target platform referring to a sum of dependencies a final target application has upon hardware or software, the final target application referring to an application that exists after the migration and consolidation.

14. The computer-implemented system according to claim 13 wherein the processor unit further performs:
discovering information of source platform, the source platform referring to a sum of dependencies a source application has upon software or hardware, the source application referring to an application in the at least one server device to be migrated or consolidated; and
packing the first metadata and the second metadata into a RFM (Request For Migration) data structure specifying the at least one selected prospective target platform component, the first metadata and the second metadata.

15. The computer-implemented system according to claim 14 wherein the processor unit further performs:
providing an interface for allowing a user to design the RFM data structure.

16. The computer-implemented system according to claim 15, wherein the interface performs steps of:
allowing the user to search the source platform based on a search criterion; presenting the user a first option to migrate the at least one source platform component to the final target platform without a modification;
presenting the user a second option to modify attributes of the at least one source platform component; and
presenting the user a third option to specify at least one final target platform component to be added to at least one final target platform, the at least one final target platform referring to an individual dependency that the final target application has upon.

17. The computer-implemented system according to claim 13, wherein the processor unit further performs:

choosing the at least one prospective target platform component based on a compatibility and an affinity of the at least one prospective target platform component; and storing, in a data repository, information of one or more of:
at least one source platform and the at least one source platform component, the at least one source platform referring to a sum of dependencies that the at least one source application has upon hardware or software, an inventory of at least one prospective target platform and the at least one prospective target platform component, the at least one prospective target platform referring to a sum of software and hardware to be provisioned for the at least one server device, the compatibility and the affinity of the at least one prospective target platform component, and the final target platform and at least one final target platform component, the at least one final target platform referring to an individual dependency that the final target application has upon.

18. The computer-implemented system according to claim 17, wherein the data repository further comprises:
an interface for enabling an access to the data repository by catching inbound requests received via a protocol and invoking actions against the data repository.

19. The computer-implemented system according to claim 17, wherein data repository includes:
an asset library for storing the inventory of at least one prospective target platform, the at least one prospective target platform component and the compatibility and the affinity of the at least one prospective target platform component.

20. The computer-implemented system according to claim 19, wherein the processor unit further performs:
providing an asset editor for allowing a user to populate or edit the inventory of at least one prospective target platform, the at least one prospective target platform component and the compatibility and the affinity of the at least one prospective target platform component.

21. The computer-implemented system according to claim 20, wherein the asset editor further performs:
adding, changing or deleting information in the asset library associated with the at least one prospective target platform components and attributes of the at prospective target platform components.

22. A non-transitory computer readable medium embodying computer program instructions being run by a processor for causing a computer to perform method steps for preparing a migration and consolidation of at least one source application to be migrated to or consolidated in at least one heterogeneous server device, said method steps comprising the steps of claim 1.

23. A method of deploying a computer program product including programs of instructions in a non-transitory computer readable medium for preparing a migration and consolidation of at least one source application to be migrated to or consolidated in at least one heterogeneous server device, wherein, when the programs of instructions are run by at least one processor, the computer program product performs the steps of claim 1.

* * * * *